US008827337B2

(12) United States Patent
Murata et al.

(10) Patent No.: US 8,827,337 B2
(45) Date of Patent: Sep. 9, 2014

(54) ROBOT HAND AND ROBOT DEVICE

(71) Applicant: Kabushiki Kaisha Yaskawa Denki, Kitakyushu (JP)

(72) Inventors: Ken-ichi Murata, Kitakyushu (JP); Takashi Mamba, Kitakyushu (JP); Go Yamaguchi, Kitakyushu (JP); Hiroshi Nakamura, Kitakyushu (JP); Ken-ichi Sadakane, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/623,946

(22) Filed: Sep. 21, 2012

(65) Prior Publication Data
US 2013/0057004 A1 Mar. 7, 2013

Related U.S. Application Data

(63) Continuation of application No. PCT/JP2011/057016, filed on Mar. 23, 2011.

(30) Foreign Application Priority Data

Mar. 24, 2010 (JP) ................................ 2010-068980

(51) Int. Cl.
*B25J 15/08* (2006.01)
*B25J 15/10* (2006.01)

(52) U.S. Cl.
USPC .............. 294/106; 294/111; 294/213; 901/36

(58) Field of Classification Search
USPC ........ 294/111, 106, 213; 414/5, 7; 74/490.04, 74/490.05, 490.06; 623/24, 57, 64; 901/21, 28, 29, 31, 36, 39
See application file for complete search history.

(56) References Cited

U.S. PATENT DOCUMENTS

| 4,865,376 A | | 9/1989 | Leaver et al. | |
|---|---|---|---|---|
| 4,921,293 A | * | 5/1990 | Ruoff et al. | 294/111 |
| 4,957,320 A | | 9/1990 | Ulrich | |
| 5,200,679 A | * | 4/1993 | Graham | 294/111 |

(Continued)

FOREIGN PATENT DOCUMENTS

| CN | 87208489 U | 9/1988 |
|---|---|---|
| CN | 1365877 | 8/2002 |

(Continued)

OTHER PUBLICATIONS

Japanese Office Action for corresponding JP Application No. 2012-507038, Aug. 7, 2013.

(Continued)

*Primary Examiner* — Paul T Chin
(74) *Attorney, Agent, or Firm* — Mori & Ward, LLP

(57) ABSTRACT

This disclosure discloses a robot hand of underactuated mechanism. The robot hand includes a plurality of actuators, a plurality of joints where the number of the joints is more than the number of the actuators, a palm portion, three finger portions each including a plurality of links having bases coupled to the palm portion and coupled being capable of flexion, and a shape-fitting mechanism which is provided in at the finger portion, and which enables to grasp an object to be grasped in an enclosing manner with the finger portions by performing providing torsional displacement to the links.

13 Claims, 31 Drawing Sheets

(56) References Cited

U.S. PATENT DOCUMENTS

| | | | |
|---|---|---|---|
| 5,447,403 A * | 9/1995 | Engler, Jr. .................... | 414/4 |
| 5,501,498 A * | 3/1996 | Ulrich .......................... | 294/106 |
| 5,570,920 A * | 11/1996 | Crisman et al. ............. | 294/111 |
| 6,260,902 B1 | 7/2001 | Synnelius | |
| 8,052,185 B2 * | 11/2011 | Madhani ...................... | 294/106 |
| 2008/0114491 A1 | 5/2008 | Takahashi | |
| 2010/0176615 A1 | 7/2010 | Okuda et al. | |

FOREIGN PATENT DOCUMENTS

| | | |
|---|---|---|
| CN | 1803413 | 7/2006 |
| CN | 101474794 | 7/2009 |
| EP | 1195151 | 4/2002 |
| EP | 1354670 | 10/2003 |
| JP | 03-130392 U | 12/1991 |
| JP | 04-082683 | 3/1992 |
| JP | 04-501682 | 3/1992 |
| JP | 2002-507493 | 3/2002 |
| JP | 2005-046980 | 2/2005 |
| JP | 2008-119770 | 5/2008 |
| JP | 2008-149448 | 7/2008 |
| JP | 2008-188697 | 8/2008 |
| JP | 2008-264895 | 11/2008 |
| JP | 2009-066683 | 4/2009 |
| JP | 2009-083020 | 4/2009 |

OTHER PUBLICATIONS

International Search Report for corresponding International Application No. PCT/JP2011/057016, Jun. 21, 2011.

Written Opinion for corresponding International Application No. PCT/JP2011/057016, Jun. 21, 2011.

Japanese Office Action for corresponding JP Application No. 2012-507038, Feb. 13, 2014.

Chinese Office Action for corresponding CN Application No. 201180015203.2, May 27, 2014.

* cited by examiner

ROBOT HAND AND ROBOT DEVICE

CROSS-REFERENCE TO RELATED APPLICATION

This is a continuation application of PCT/JP2011/057016, filed Mar. 23, 2011, which was not published under PCT article 21(2) in English.

FIELD OF THE INVENTION

Disclosed embodiments relate to a robot hand provided with multi-joint fingers for grasping an object and to a robot device.

DESCRIPTION OF THE RELATED ART

In recent years, development of a robot that can replace human beings in work has been expected. A hand of the robot particularly needs to be able to handle tools etc. used by a human. As prior arts related to such a robot hand, there has been already known arts.

SUMMARY OF THE INVENTION

According to one aspect of the present invention, there is provided a robot hand of underactuated mechanism. The robot hand comprises a plurality of actuators, a plurality of joints where the number of the joints is more than the number of the actuators, a palm portion, at least two finger portions each including a plurality of links having bases coupled to the palm portion and coupled being capable of flexion, and a shape-fitting mechanism which is provided in at least one of the finger portion, and which enables to grasp an object to be grasped in an enclosing manner with the finger portions by performing at least one of providing torsional displacement to the links and adjusting drive torque required for driving the joints.

DESCRIPTION OF THE EMBODIMENTS

<First Embodiment>

First, a first embodiment will be explained. The embodiment has such a configuration that fingers can grasp an object to be grasped in an enclosing manner by the fingers by a shape-fitting mechanism in which torsional displacement is provided to a link.

Figure 1:
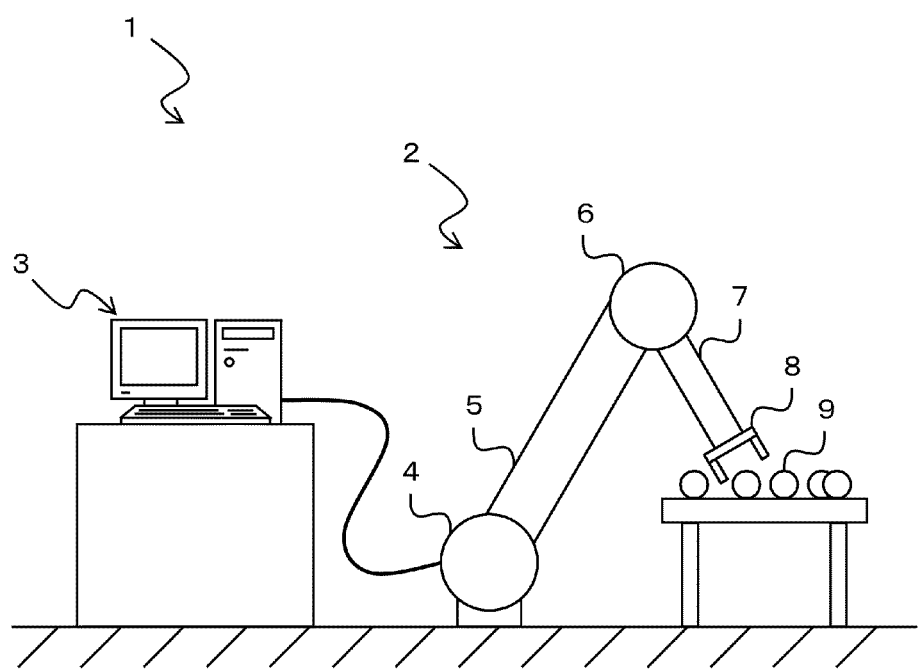
FIG. 1 is a conceptual explanatory view of a robot device provided with a robot hand in accordance with a first embodiment.

In FIG. 1, a robot device 1 has a robot body 2 and a personal computer 3 (hereinafter abbreviated as a PC3) that controls operation of the robot body 2. It is to be noted that the PC3 corresponds to one example of a controller described in the claims. In addition, the controller may be provided on a side of the robot body 2, for example, it is installed near each joint of the robot body 2, at a palm portion 11 of a robot hand 8, etc.

The robot body 2 of an illustrated example is a two joint arm type robot, and is provided with: a first joint actuator 4 fixed to a floor portion; a first arm 5 whose positional posture is controlled by the first joint actuator 4; a second joint actuator 6 fixed at a tip of the first arm 5; a second arm 7 whose positional posture is controlled by the second joint actuator 6; and the robot hand 8 according to the embodiment fixed at a tip of the second arm 7.

In the above-described configuration, the robot body 2 can bring the robot hand 8 close to an object to be grasped 9 by causing the respective joint actuators 4 and 6 to control positional postures of the corresponding arms 5 and 7, respectively. The robot hand 8 then grasps the object to be grasped 9, further controls the positional postures of the respective arms 5 and 7, and thereby can move the object to be grasped 9. It is to be noted that although the robot hand 8 is moved only by rotating operation of the two joint actuators 4 and 6 in the illustrated example, in addition to this, an actuator (not shown in particular) etc. may be provided that makes the respective arms 5 and 7 perform rotating operation with a longitudinal direction as an axis of rotation, or a robot of further multi-joint robot hand (for example, seven-joint one) may be employed, not limited to two joint robot hand.

The PC3 generates/transmits a control command respectively corresponding to the respective actuators 4 and 6 provided at the robot body 2, thereby performs cooperative control of the respective actuators 4 and 6, performs grasp control of the robot hand 8, and controls the whole robot body 2 so as to operate smoothly.

Figure 2:
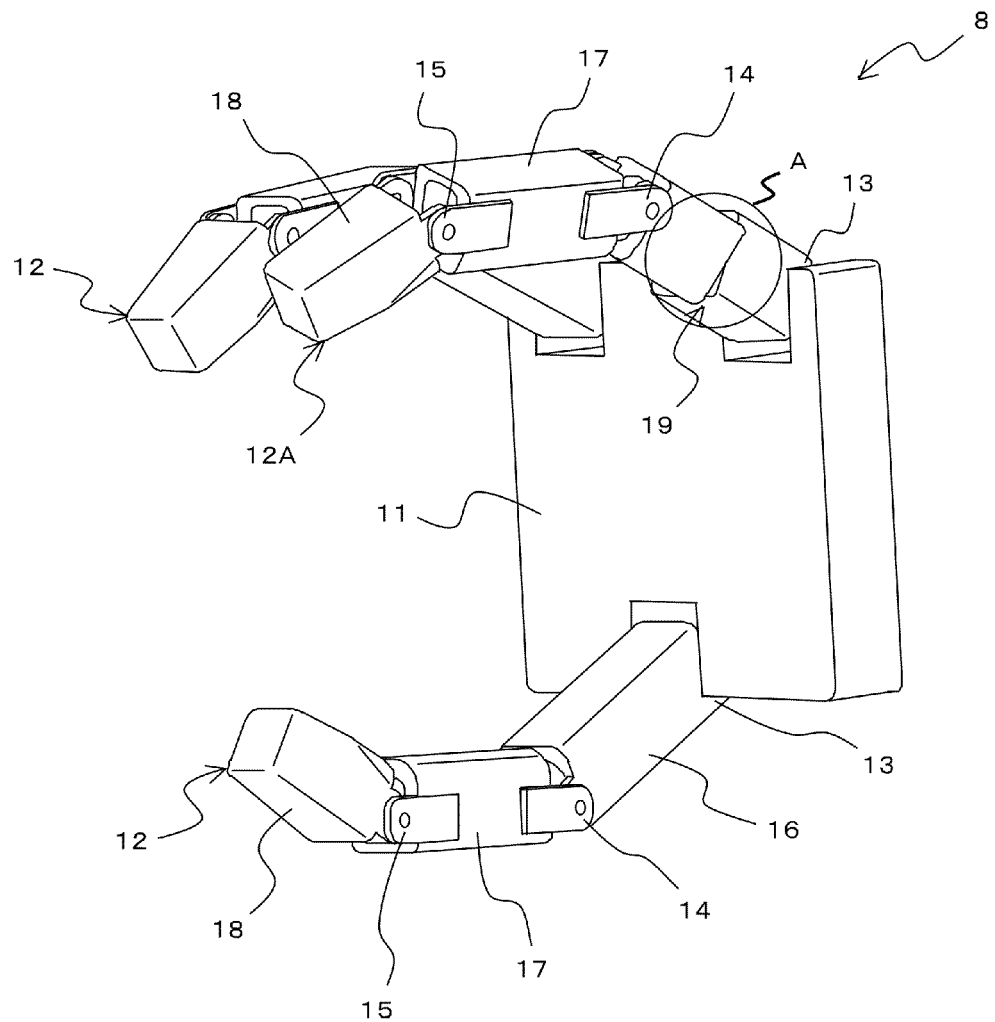
FIG. 2 is a perspective view representing an external structure of the robot hand in accordance with the first embodiment.

In FIG. 2, the robot hand 8 of the illustrated example has the palm portion 11, and three finger portions 12 having bases coupled to the palm portion 11, and arranged extending from the palm portion 11. In each finger portion 12, three links 16, 17, and 18 are coupled in series through two of a second joint 14 and a third joint 15 that are respectively configured with a hinge, and the link 16 on the base side is coupled to the palm portion 11 through one first joint 13. In this example, axes of rotation of the respective joints 13, 14, and 15 in the one finger portion 12 are in an arrangement relation parallel to one another, and each finger portion 12 can perform flexion and extension operation like oscillation on one flat surface. The three finger portions 12 flex so as to be close to one another, and thereby the robot hand 8 can grasp the object to be grasped 9 by three-point support. Additionally, as a feature of the robot hand 8 of the embodiment, a twist joint portion 19 is provided in at least one link (the link 16 on the side directly coupled to the palm portion 11 in this example) in at least one (a finger portion 12A located at an upper right in FIG. 2 in this example) of the above-described three finger portions 12.

Next, an internal structure of the whole finger portion 12A provided with the above-mentioned twist joint portion 19 will be explained using FIG. 3. It is to be noted that in FIG. 3, illustrations of a wall portion etc. that constitute a skin of the palm portion 11 having a hollow structure, and the respective links 16, 17, and 18 are appropriately omitted.

Figure 3:
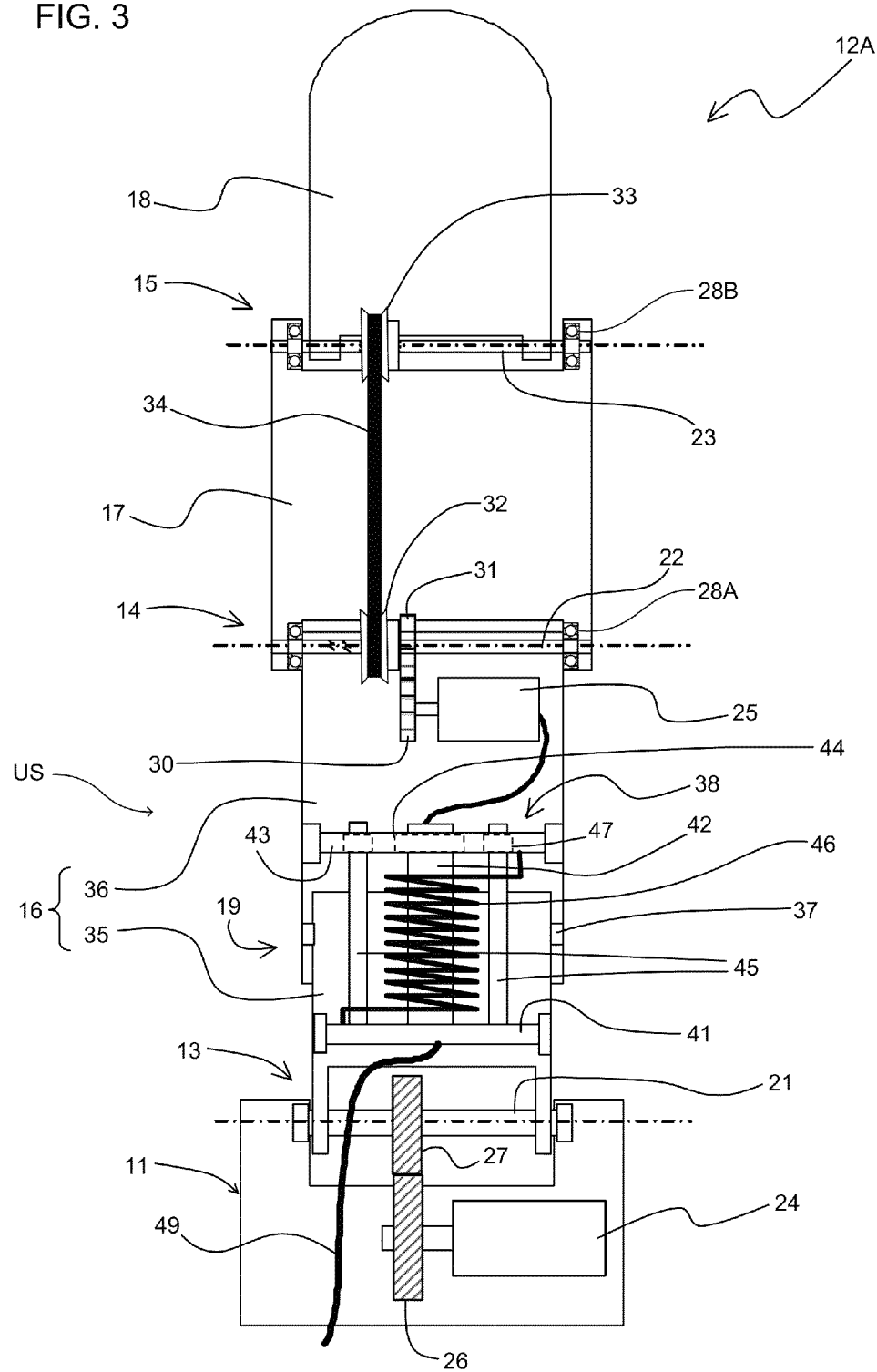
FIG. 3 is a longitudinal sectional view showing an internal structure of a whole finger portion provided with a twist joint portion.

In FIG. 3, the first link 16 is coupled being capable of flexion to an edge portion of the palm portion 11 through a first joint shaft 21. The second link 17 is coupled being capable of flexion to a free end of the first link 16 through a second joint shaft 22, and the third link 18 is coupled being capable of flexion to a free end of the second link 17 through a third joint shaft 23. In a usual state, axes of rotation of the three joint shafts 21, 22, and 23 are in an arrangement relation parallel to one another.

A first joint drive motor 24 is installed in the palm portion 11, and a first joint drive gear 26 fixed to an output shaft of the first joint drive motor 24 meshes with a first joint driven gear 27 fixed to the above-described first joint shaft 21. While supported rotatably with respect to the palm portion 11, the first joint shaft 21 is fixedly combined with the above-described first link 16. As a result, it is possible to actively flex the first link 16 with respect to the palm portion 11 by rotational drive of the first joint drive motor 24. It is to be noted that the first joint drive motor 24 corresponds to one example of an actuator and a first actuator described in each claim.

A second joint drive motor 25 is installed at the first link 16, and a second joint drive gear 30 is fixed to an output shaft of the second joint drive motor 25. The second joint shaft 22 is supported rotatably with respect to the first link 16, and is also supported rotatably with respect to the above-described second link 17 by a bearing 28A. In addition, the second joint drive gear 30 meshes with a second joint driven gear 31 fixed to the second joint shaft 22. As a result, it is possible to actively flex the second link 17 with respect to the first link 16 by rotational drive of the second joint drive motor 25. It is to be noted that the second joint drive motor 25 corresponds to one example of the actuator and a second actuator described in each claim.

A third joint drive pulley 32 is integrally combined with the above-described second joint driven gear 31. Meanwhile, a third joint driven pulley 33 is fixed to the third joint shaft 23, and a belt 34 is spanned between the third joint driven pulley 33 and the above-described third joint drive pulley 32. It is to be noted that a wire member may be used. While supported rotatably with respect to the second link 17 by a bearing 28B, the third joint shaft 23 is fixedly combined with the above-described third link 18. As a result, the rotational drive of the second joint drive motor 25 is transmitted through the belt 34, and thereby the third link 18 can be actively flexed with respect to the second link 17. In addition, since the belt 34 is simply spanned (is not twisted) between the two pulleys 32 and 33, both the second link 17 and the third link 18 operate so as to flex toward the same side while the second joint drive motor 25 is rotationally driven. In other words, the third link 18 is flexed in an underactuated mode of the second link 17. It is to be noted that a flexion angle of the third link 18 is affected also by a pulley diameter ratio of the above-described third joint drive pulley 32 and third joint driven pulley 33.

Additionally, the above-described first link 16 is separated into two of a first small link 35 and a second small link 36 along an axial line direction thereof. A tip portion of the first small link 35 located on a palm portion 11 side is fitted and inserted inside the second small link 36 located on a fingertip side (second link 17 side). Although not shown in particular, for example, a fitting portion of the first small link 35 is formed in a cylindrical shape, and a fitting portion of the second small link 36 is formed having a substantially same inner diameter as that of an outer circumference of the cylindrical portion. Therefore, the first small link 35 and the second small link 36 are mutually coupled so as to be capable of relative torsional displacement around an axis of rotation along a longitudinal direction of the whole first link 16, and the twist joint portion 19 is configured with such a fitting portion (refer to an A portion in the above-described FIG. 2). In addition, a small link bearing is provided between an outer circumference of the first small link 35 and an inner circumference of the second small link 36, this small link bearing 37 makes smooth sliding between the first small link 35 and the second small link 36 in a radial direction, and prevents fall-out between the first small link 35 and the second small link 36 in a thrust direction. The above-described second joint drive motor 25 is installed inside the second small link 36. It is to be noted that the first small link 35 and the second small link 36 correspond to one example of two small link members described in each claim.

Further, inside the twist joint portion 19 of the first link 16, provided is a twist mechanism 38 that assists the relative torsional displacement between the above-described first small link 35 and second small link 36. A detailed structure of the twist mechanism 38 will be explained using FIG. 4.

Figure 4:
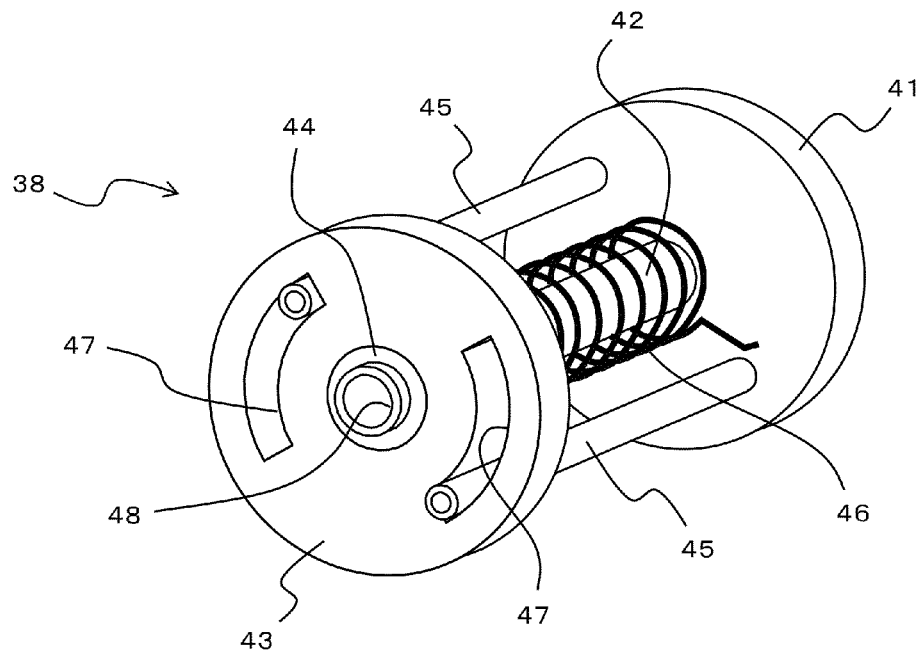
FIG. 4 is an external perspective view of a twist mechanism that is provided at the twist joint portion.

In FIG. 4 and the above-described FIG. 3, the twist mechanism 38 has: a shaft support plate 41; a shaft 42; a guide plate 43; a shaft bearing 44; two guide bars 45; and a torsion spring 46. The shaft support plate 41 and the guide plate 43 are formed in a disk shape with a substantially same diameter, respectively, and are arranged in parallel, mutual central axes thereof coinciding with each other. The shaft 42 is formed in a hollow cylindrical shape, one end (a lower end in FIG. 3) thereof is fixed to a center of the shaft support plate 41, the other end (a top end in FIG. 3) thereof penetrates a center of the guide plate 43, and the shaft 42 is rotatably supported through the shaft bearing 44.

In addition, in the guide plate 43, formed are two circular guide grooves 47 respectively having a same inner circumferential angle with respect to the center of the guide plate 43. One end (lower end in FIG. 3) of each of the two guide bars 45 is vertically combined with the shaft support plate 41, and the other end (top end in FIG. 3) thereof is made to penetrate the corresponding guide groove 47. Respective combinations of the guide bars 45 and the guide grooves 47 are in a same arrangement relation, and for example, when the guide bar 45 is located at the end of one guide groove 47 as shown in the drawing, the guide bar 45 is located at the corresponding end also in the other guide groove 47. As a result, the shaft support plate 41, the shaft 42, and the two guide bars 45 are relatively rotatably coupled with respect to the guide plate 43 by the inner circumferential angle of each guide groove 47.

The torsion spring 46 is a spring rolled spirally, is coaxially arranged on an outer circumference of the shaft 42, one end (a lower end in FIG. 3) of the torsion spring 46 is fixed to the shaft support plate 41, and the other end (a top end in FIG. 3) thereof is fixed to the guide plate 43. As a result, the guide plate 43 is always biased in a same rotational direction (a counter clockwise direction in an example shown in FIG. 4) from the shaft support plate 41.

It is to be noted that the shaft 42 corresponds to one example of a shaft member described in each claim, and that the shaft bearing 44 corresponds to one example of a bearing member. Side wall portions of the guide bars 45 and 45 and the guide grooves 47 and 47 correspond to one example of a guide member, and groove ends of the guide grooves 47 and 47 correspond to one example of a regulating member. In addition, the torsion spring 46 corresponds to one example of a first spring member and one example of a return force providing member.

The twist mechanism 38 having such configuration is penetrated and arranged in a state where the fitting portion (i.e., the twist joint portion 19) of the above-described first small link 35 and second small link 36 is made to coincide with the axis of rotation. Particularly, the shaft support plate 41 is fixed inside the first small link 35, and the guide plate 43 is fixed inside the second small link 36. In addition, the shaft 42 is formed in a state where a through-hole 48 penetrates in an axial direction in the inside thereof, and a cable member 49 of the above-described second joint drive motor 25 is made to pass through the through-hole 48. In addition, while the shaft 42 is provided at the first small link 35, the shaft bearing 44 is provided at the second small link 36 to rotatably support the shaft 42. In addition, the two guide bars 45 and the two guide grooves 47 guide relative rotation of the first small link 35 and the second small link 36 along with the rotation of the shaft 42, and regulate within predetermined ranges amounts of rotation in relative rotation directions of the first small link 35 and the second small link 36 along with the rotation of the shaft 42. In addition, the torsion spring 46, along with the rotation of the shaft 42, provides return force that displaces the first small link 35 and the second small link 36 that are displaced in a positive rotation direction (a direction where the guide plate 43 of the second small link 36 is displaced in the counter clockwise direction, and the shaft support plate 41 of the first small link 35 is displaced in a clockwise direction, i.e., the direction moving away from each other, in FIG. 4) in a reverse rotation direction opposite to the above.

As described above, in the embodiment, a shape-fitting mechanism US having the first small link 35 and the second small link 36, the twist joint portion 19, and the twist mechanism 38 is provided at the finger portion 12A, torsional displacement is provided to the second link 17 and the third link 18, and whereby it becomes possible to grasp the object to be grasped 9 in an enclosing manner by the three finger portions 12.

Figure 5:
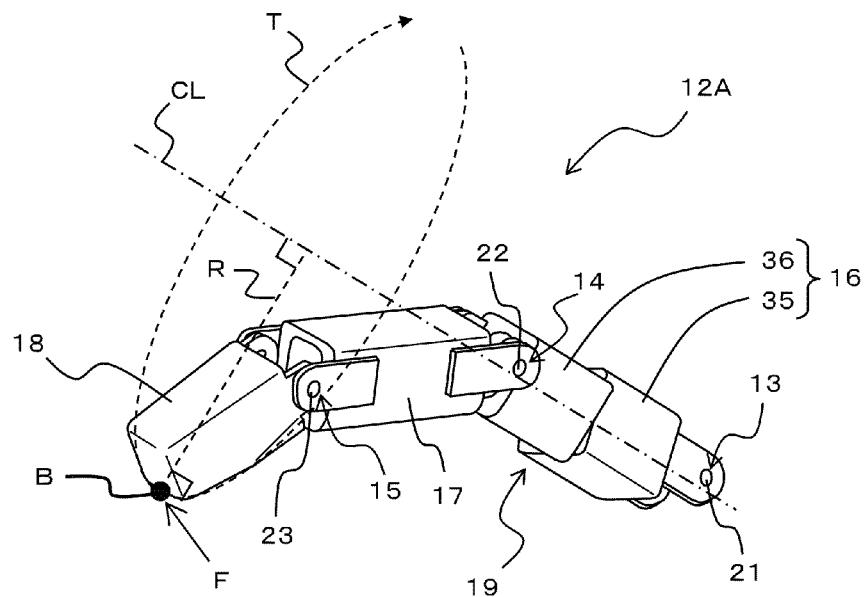
FIG. 5 is a perspective view of a finger portion provided with three flexion joints and one twist joint portion.

In FIG. 5, an axis line of the third joint shaft 23 between the third link 18 and the second link 17, and an axis line of the second joint shaft 22 between the second link 17 and the first link 16 are parallel to each other, and these joint shafts are respectively driven so as to mutually flexed by the second joint drive motor 25 arranged inside the second small link 36. Namely, each flexion joint of the first joint shaft 21, the second joint shaft 22, and the third joint shaft 23 that have only a single degree of freedom, respectively has only a degree of freedom enough to oscillate (flex/extend) the respective links 16, 17, and 18 in a same flat surface even though the flexion joints are combined with one another. In contrast with this, in the finger portion 12A provided in the embodiment, the first link 16 is provided with the twist joint portion 19, and it is possible to perform relative rotation (relative torsional displacement) around an axis of rotation CL of the first small link 35 and the second small link 36 as shown in the figure, thus allowing a degree of freedom of movement of the fingertip to be further increased.

For example, when external force F is applied to a point B located on a finger pad of the third link 18 in posture in FIG. 5, torque T is generated around the axis of rotation of the second small link 36 with a distance from the external force F to the axis of rotation CL of the second small link 36 being set as a radius of rotation R. Biasing force of the torsion spring 46 of the twist mechanism 38 acts so as to resist the torque T, and the second small link 36 and the first small link 35 become states of standing still at predetermined angles. It is to be noted that the twist mechanism 38 needs to have biasing force enough to keep to be zero a relative angle of the third link 18, the second link 17 and the second small link 36, and the first small link 35, unless the external force F is applied. Namely, the torsion spring 46 needs to have spring stiffness enough to hold self-weights of the third link 18, the second link 17, and the second small link 36 in a state where an object is not grasped.

Figure 6:
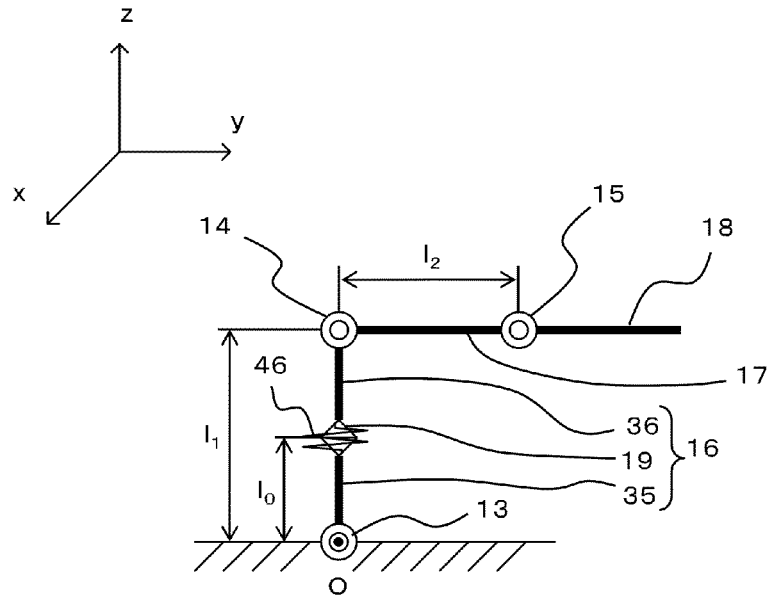
FIG. 6 is a model view of a four-joint finger of the finger portion provided with the twist joint portion.

Next, using a model view of a four-joint finger shown in FIG. 6, an equation of motion of the finger portion 12A of the robot hand 8 will be determined, and behavior thereof will be analyzed.

In FIG. 6, the twist joint portion 19 is constrained around a Z axis by the torsion spring 46, and is arranged between the first small link 35 and the second small link 36. The twist joint portion 19, the first small link 35, and the second small link 36 correspond to the first link 16. The second joint 14, the second link 17, the third joint 15, and the third link 18 are arranged at the free end of the first link 16, and the first link 16 is driven by the first joint 13. An axial center point of the first joint 13 is defined as an original point, a length from the first joint 13 to the twist joint portion 19 is $l_0$, a length from the first joint 13 to the second joint 14 is $l_1$, and a length from the second joint 14 to the third joint 15 is $l_2$. At this time, for example, based on "A mathematical introduction to Robotic Manipulation" (CRC press, 1994, p. 172 to p. 175) written by R M. Murray, ZLi, S. S Sastry, an equation of motion is determined as follows. First, when twist vectors ($\xi 1$, $\xi 2$, $\xi 3$, $\xi 4$) of points on the respective joints 13, 14, and 15 are determined, they are expressed by the following Equation (1). The twist vector can be obtained from a velocity vector and an angular velocity vector.

$$\xi_i = \begin{bmatrix} -\omega_i \times q_i \\ \omega_i \end{bmatrix}, \xi_1 = \begin{bmatrix} 0 \\ 0 \\ 0 \\ -1 \\ 0 \\ 0 \end{bmatrix}, \xi_2 = \begin{bmatrix} 0 \\ 0 \\ 0 \\ 0 \\ 0 \\ 1 \end{bmatrix}, \quad \text{[Equation 1]}$$

$$\xi_3 = \begin{bmatrix} 0 \\ -l_1 \\ 0 \\ -1 \\ 0 \\ 0 \end{bmatrix}, \xi_4 = \begin{bmatrix} 0 \\ -l_1 \\ l_2 \\ -1 \\ 0 \\ 0 \end{bmatrix}$$

When relative positions of centers of mass of the respective links 16, 17, and 18 are determined with the axial center point of the first joint 13 being set as the original point, if a center of mass position of the first small link 35 between the first joint 13 and the twist joint portion 19 is set to be (0, 0, $r_0$), a center of mass position of the second small link 36 between the twist joint portion 19 and the second joint 14 is (0, 0, $l_0+r_1$), a center of mass position of the second link 17 between the second joint 14 and the third joint 15 is (0, $r_2$, $l_1$), a center of mass position of the third link 18 is (0, $l_2+r_3$, $l_1$), and an angular velocity is 0, the relative positions are expressed by the following Equation (2).

$$g_{bl_1} = \begin{bmatrix} I & \begin{pmatrix} 0 \\ 0 \\ r_0 \end{pmatrix} \\ 0 & 1 \end{bmatrix}, g_{bl_2} = \begin{bmatrix} I & \begin{pmatrix} 0 \\ 0 \\ l_0+r_1 \end{pmatrix} \\ 0 & 1 \end{bmatrix}, \quad \text{[Equation 2]}$$

$$g_{bl_3} = \begin{bmatrix} I & \begin{pmatrix} 0 \\ r_2 \\ l_1 \end{pmatrix} \\ 0 & 1 \end{bmatrix}, g_{bl_4} = \begin{bmatrix} I & \begin{pmatrix} 0 \\ l_2+r_3 \\ l_1 \end{pmatrix} \\ 0 & 1 \end{bmatrix}$$

Next, a Jacobian matrix of a position and posture is expressed by the following Equation (3).

$$J_1 = \begin{bmatrix} 0 & 0 & 0 & 0 \\ r_0 & 0 & 0 & 0 \\ 0 & 0 & 0 & 0 \\ -1 & 0 & 0 & 0 \\ 0 & 0 & 0 & 0 \\ 0 & 0 & 0 & 0 \end{bmatrix}, J_2 = \begin{bmatrix} (l_0+r_1)s_2 & 0 & 0 & 0 \\ -(l_0+r_1)c_2 & 0 & 0 & 0 \\ 0 & 0 & 0 & 0 \\ -c_2 & 0 & 0 & 0 \\ s_2 & 0 & 0 & 0 \\ 0 & 1 & 0 & 0 \end{bmatrix}, \quad \text{[Expression 3]}$$

$$J_3 = \begin{bmatrix} s_2(l_1-r_2s_3) & -r_2s_3 & 0 & 0 \\ l_1c_2c_3 & 0 & 0 & 0 \\ c_2(l_1s_3-r_2) & 0 & -r_2 & 0 \\ -c_2 & 0 & -1 & 0 \\ s_2c_3 & -s_3 & 0 & 0 \\ s_3s_3 & c_3 & 0 & 0 \end{bmatrix},$$

$$J_4 = \begin{bmatrix} J_{411} & J_{412} & 0 & 0 \\ J_{421} & 0 & 0 & 0 \\ J_{431} & 0 & -r_3 & -r_3 \\ c_2 & 0 & -1 & -1 \\ -s_2c_{34} & -s_{34} & 0 & 0 \\ -s_2s_{34} & c_{34} & 0 & 0 \end{bmatrix}$$

-continued $$M_i^* = \begin{bmatrix} m_i & 0 & 0 & 0 & 0 & 0 \\ 0 & m_i & 0 & 0 & 0 & 0 \\ 0 & 0 & m_i & 0 & 0 & 0 \\ 0 & 0 & 0 & I_{xi} & 0 & 0 \\ 0 & 0 & 0 & 0 & I_{yi} & 0 \\ 0 & 0 & 0 & 0 & 0 & I_{zi} \end{bmatrix}$$

$$M(\theta) = \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix} =$$

$$J_1^T M_1^* J_1 + J_2^T M_2^* J_2 + J_3^T M_3^* J_3 + J_4^T M_4^* J_4$$

Here, $s_i$ represents $\sin(\theta_i)$, $c_i \cos(\theta_i)$, $s_{ij} \sin(\theta_i+\theta_j)$, $c_{ij} \cos(\theta_i+\theta_j)$, and $I_{ii}$ represents moment of inertia. Since the equation becomes complicated, representation of $J_{411}$, $J_{412}$, $J_{421}$, and $J_{431}$ are omitted. Since $M_i^*$ represents calculation of an inertia tensor with respect to a coordinate system with the center of gravity of each link being set as the original point, an off-diagonal term is 0. Further, the equation (3) is eventually expressed by a form of the following Equation (4) by utilizing a Lagrange method etc.

$$M(\theta)\ddot{\theta} + C_{ij}(\theta, \dot{\theta})\dot{\theta} + N(\theta, \dot{\theta}) + \quad \text{[Expression 4]}$$

$$\begin{pmatrix} 0 & 0 & 0 & 0 \\ 0 & K_2 & 0 & 0 \\ 0 & 0 & K_3 & 0 \\ 0 & 0 & 0 & K_4 \end{pmatrix} \begin{pmatrix} \theta_1 \\ \theta_2 \\ \theta_3 \\ \theta_4 \end{pmatrix} = \begin{pmatrix} \tau_1 \\ 0 \\ \tau_2 \\ \tau_2 \end{pmatrix}$$

In this equation, $c_{ij}$ represents centrifugal force and Coriolis force, N a gravity term, $K_2$ a torsion spring constant of the twist joint portion 19, $K_3$ a torsion spring constant of the second joint 14, and $K_4$ a torsion spring constant of the third joint 15. In addition, torque of each actuator is simple since it is two variables of $\tau_1$ and $\tau_2$ as represented in Equation (4) as compared with a case of driving the respective joints 13, 14, and 15.

Next, will be explained specifically a control content of the finger portion 12A of the actual robot hand 8 in line with a principle represented by the above-described equation of motion. As mentioned above, the actuator that drives the first joint 13 is the first joint drive motor 24, and this first joint drive motor 24 is provided with a control device (not shown in particular) that outputs a motor current. This control device inputs a deviation signal of a first joint command calculated by the PC3 based on the above-described equation of motion and angle information by an encoder (not shown in particular) of the motor 24, outputs the corresponding motor current, and thereby drives the first joint drive motor 24. Drive force of the first joint drive motor 24 corresponds to actuator torque $\tau_1$, and controls flexion operation in the first joint 13. It is to be noted that this actuator torque $\tau_1$ corresponds to one example of first drive force described in each claim.

In addition, actuators that drive the second joint 14 are the second joint drive motor 25, and gears 30 and 31, and an actuator that drives the third joint 15 is the second joint drive motor 25. Similarly to the above, a deviation signal of a second joint command calculated by the PC3 and angle information by an encoder (not shown in particular) of the second joint drive motor 25 is input to a control device (not shown) provided at the second joint drive motor 25, the corresponding motor current is input, and the second joint drive motor 25 is driven. Drive force of the second joint drive motor 25 corresponds to actuator torque $\tau_2$, and controls flexion operation in the second joint 14 and the third joint 15. It is to be noted that this actuator torque $\tau_2$ corresponds to one example of second drive force described in each claim.

Namely, the second joint drive gear 30 fixed to the output shaft of the second joint drive motor 25 drives the second joint driven gear 31 fixed to the second joint shaft 22. That is, the second joint drive motor 25 transmits the actuator torque $\tau_2$ to the second link 17 through the second joint drive gear 30 and the second joint driven gear 31, and flexes the second link 17 centering on the second joint shaft 22. It is to be noted that the second joint drive gear 30 and the second joint driven gear 31 correspond to one example of a gear mechanism described in each claim, and also correspond to one example of a drive transmission mechanism for a second link.

In addition, the second joint drive gear 30 fixed to the output shaft of the second joint drive motor 25 drives the second joint driven gear 31 fixed to the second joint shaft 22, further drives the third joint drive pulley 32 and the belt 34, and transmits force to the third joint driven pulley 33 fixed to the third joint shaft 23. That is, the second joint drive motor 25 also transmits the actuator torque $\tau_2$ to the third link 18 through the second joint drive gear 30, the second joint driven gear 31, the third joint drive pulley 32, the belt 34, and the third joint driven pulley 33, and flexes the third link 18 centering on the third joint shaft 23. It is to be noted that the third joint drive pulley 32, the third joint driven pulley 33, and the belt 34 correspond to one example of a pulley mechanism described in each claim, and that these and the second joint drive gear 30 and the second joint driven gear 31 correspond to one example of a drive transmission mechanism for a third link described in each claim.

As explained above, the embodiment has such a structure that at least one link 16 of any one of finger portion 12A of a plurality of finger portions 12 and 12A that are provided at the robot hand 8 is separated into the two small links 35 and 36, and that these two small links 35 and 36 are coupled to each other. Relative torsional displacement of these two small links 35 and 36 can be mutually performed around the axis line CL of the finger portion 12A. As a result of this, since a degree of freedom due to the above-described torsional displacement increases by a single degree, the finger portion 12A provided with the separated link 16 can operate not only in a grasp direction approaching the object to be grasped 9 and in a release direction moving away from the object 9 as mentioned above, but can perform movement so that an angle toward the object 9 is changed to change posture opposed to the object 9. At least one finger portion 12A provided with the shape-fitting mechanism US that allows for such a movement, and thereby the robot hand 8 in the embodiment can perform flexible grasping following a shape of the object 9 with respect thereto than in a structure of a prior art. It is to be noted that by providing an additional actuator, it also becomes possible, for example, to make the robot hand 8 approach/move away from the object 9 at an angle conforming to a curved surface shape of a surface of the object 9, to make it move along the surface of the object 9, or to make it approach/move away from the object 9 in a state where posture is twisted obliquely to the object 9, etc.

In addition, particularly in this embodiment, the relative rotations of the two small links 35 and 36 of the twist mechanism 38 along with the rotation of the shaft 42 are guided by the guide bar 45 and the guide groove 47 of the guide plate 43. As a result, the small link 35 of one side and the small link 36 of the other side are relatively displaced more smoothly, and thereby smoother movement of the finger portion 12A provided with the two small links 35 and 36 can be achieved.

In addition, particularly in this embodiment, the amounts of rotation in the relative rotation directions of the small links 35 and 36 along with the rotation of the shaft 42 are regulated within the predetermined ranges by the above-described guide groove 47 of the twist mechanism 38. As a result, the relative displacement of the small link 35 of the one side and the small link 36 of the other side is suppressed within a certain range, and the robot hand 8 can be controlled not to take improper posture and not to perform unnatural operation. As a result of this, smoother movement is achieved, and durability and reliability can also be improved.

In addition, particularly in this embodiment, the torsion spring 46 of the twist mechanism 38 provides the return force that displaces to the reverse rotation direction the two small links 35 and 36 that are displaced in the positive rotation direction along with the rotation of the shaft 42. As a result, after the two small links 35 and 36 are relatively displaced to get contact with the surface of the object 9, passive stable grasping operation conforming to the shape of the object 9 can be achieved. In addition, by the passive operation, a contact area with the object 9 increases between the third link 18 of the fingertip and the first link 16 of the base, and also thereby stable grasp can be performed. In addition, when the grasped object 9 is released, the two small links 35 and 36 can be automatically made to return to an original state before the relative displacement even though compulsory drive force is not provided in a return direction. As a result of these, movement close to that of human fingers, and having little feeling of strangeness can be reliably achieved.

In addition, particularly in the embodiment, the first link 16 of the palm portion 11 side is configured with the two small links 35 and 36 capable of relative torsional displacement, and large posture change from a base side of the finger portion 12A can be performed. In addition, while the first link 16 is oscillated (flexed and extended) by the actuator torque $\tau_1$ from the first joint drive motor 24 arranged at the palm portion 11, the second link 17 and the third link 18 are oscillated (flexed and extended) by the actuator torque $\tau_2$ of the second joint drive motor 25 arranged at the first link. As a result, the first link 16, and the second link 17 and the third link 18 can be mutually independently oscillated (flexed and extended).

In addition, the second joint drive motor 25 is arranged at the second small link 36 of the second link 17 side, and while transmitted to the second link 17 by the second joint drive gear 30 and the second joint driven gear 31, the actuator torque $\tau_2$ from the second joint drive motor 25 is transmitted also to the third link 18 by the third joint drive pulley 32, the belt 34, and the third joint driven pulley 33. By commonizing the actuator for oscillating the second link 17 and the actuator for oscillating the third link 18, as compared with a case of driving the joints by each independent actuator, load of actuator drive control can be reduced, and the links can be oscillated (flexed and extended) at a higher speed. At this time, the above-described third joint drive gear 30, third joint driven gear 31, third joint drive pulley 32, belt 34, and third joint driven pulley 33 can transmit the actuator torque $\tau_2$ from the second joint drive motor 25 to the third link 18. As a result, the third link 18 can be smoothly driven by the underactuated mode of the second link 17, and natural flexion operation like human that works with flexion operation of the second link 17 can be achieved.

Further, the actuators for driving the second link 17 and the third link 18 are commonized as one second joint drive motor 25 as described above, and the first joint drive motor 24 for driving the first link 16 is arranged at the palm portion 11, whereby the actuator arranged at the finger portion 12A is only one second joint drive motor 25. As a result of this, weight reduction of the whole finger portion 12A can also be achieved.

In addition, in this embodiment, the through-hole 48 for making penetrate the cable member 49 to the second joint drive motor 25 is provided at the shaft 42, and thereby the cable member 49 of the second joint drive motor 25 that is arranged at the second small link 36 of the second link 17 side can be smoothly disposed at the palm portion 11 without being exposed to the outside of the robot hand 8. In addition, as a result, a power amplifier of the actuator can be arranged at the palm portion 11, and also thereby weight reduction of the finger portion 12A can be achieved.

It is to be noted that although in the above-described embodiment, only the first link 16 in one finger portion 12A of the three finger portions 12 and 12A provided at the robot hand 8 has a configuration capable of relative torsional displacement, the present disclosure is not regulated to this. For example, the plurality of (or all) finger portions 12 may have the configuration, or the links 17 and 18 other than the first link 16 may have it.

It is to be noted that the present disclosure is not regulated to the above-described embodiment, and that various modifications can be made without departing from the subject matter and the technical idea of the disclosure. Hereinafter, such modified examples will be explained in order.

(1-1) Case of using tension spring

In the above-described embodiment, the return force of displacing the second small link 36 and the first small link 35 in the twist mechanism 38 in the reverse rotation direction with respect to the relative torsional displacement therebetween is obtained by the torsion spring 46, but the present disclosure is not regulated to this. For example, a configuration may be employed in which the above-described return force is obtained by the tension spring spanned between the guide plate 43 and the guide bar 45.

Figure 7:
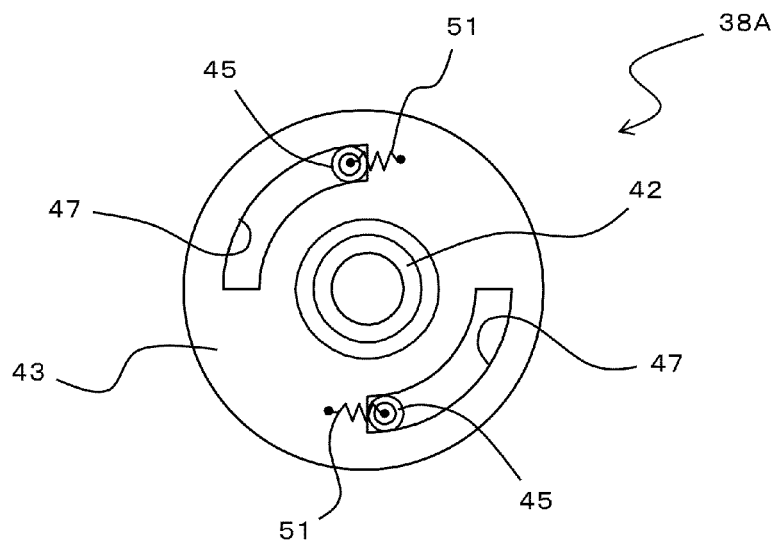
FIG. 7 is an elevational view of a guide plate of a twist mechanism in a modified example where return force is obtained by a tension spring.

In FIG. 7, a twist mechanism 38A of the modified example is not provided with the torsion spring 46 in the above-described embodiment, and instead, it is provided with two helical springs 51. These two helical springs 51 are spanned between the corresponding ends on the fingertip side (front side in the drawing) of the guide bar 45 and ends of the guide groove 47 that are initial positions of the helical springs 51, and always provide biasing force to pull the guide bar 45 to the respective ends. It is to be noted that the helical spring 51 corresponds to one example of a spring member described in each claim and one example of the return force providing member.

Also in the modified example, passive stable grasping operation and return to the original state after grasp release can be performed utilizing the biasing force due to elasticity of the helical spring 51, thus enabling to obtain an effect similar to that of the above-described embodiment.

(1-2) Case of using permanent magnet

Figure 8:
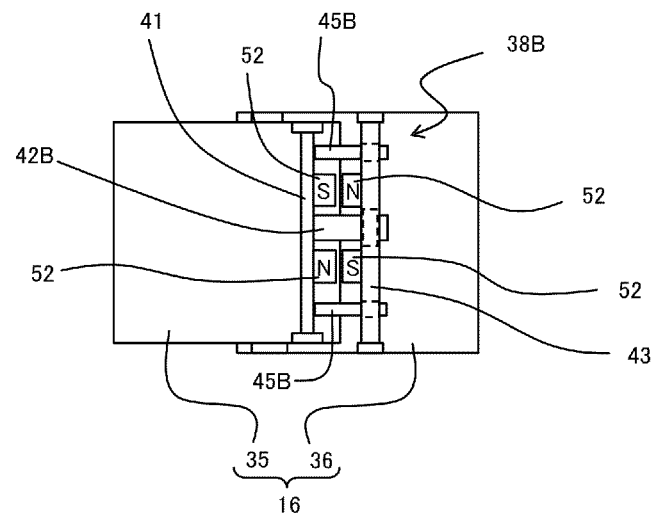
FIG. 8 is a main part enlarged longitudinal sectional view of a first link in a modified example where return force is obtained by a permanent magnet.

In addition, the above-described return force in the twist mechanism may be obtained using a permanent magnet. In FIG. 8, a twist mechanism 38B of the modified example is not provided with the torsion spring 46 in the above-described embodiment, and instead, a permanent magnet 52 is provided on respective surfaces opposed to each other of the shaft support plate 41 and the guide plate 43. In so doing, magnetic poles (a north pole and a south pole) of each permanent magnet 52 is arranged so that the pair of permanent magnets 52 opposed to each other mutually exerts attraction force in a state where the shaft support plate 41 and the guide plate 43 are located at initial relative rotation positions.

As a result, since the opposing permanent magnets 52 has a combination of the north pole and the south pole, or of the south pole and the north pole, always provide force of trying to return the shaft support plate 41 and the guide plate 43 to the initial positions. It is to be noted that in order that magnetic force sufficiently affects the opposing permanent magnets 52, in this example, a shaft 42B and a guide bar 45B are formed comparatively short, and the shaft support plate 41 and the guide plate 43 are arranged so as to be sufficiently close to each other. In addition, it is preferable to respectively use a non-magnetic material with a low density, for example, aluminum, for each member of the shaft support plate 41, the shaft 42B, the guide plate 43, and the guide bar 45B that constitute the twist mechanism 38B. It is to be noted that the permanent magnet 52 corresponds to one example of the return force providing member described in each claim.

In the modified example, passive stable grasping operation and return to the original state after grasp release can be performed utilizing the attraction force with which the pair of permanent magnets 52 and 52 is pulled to each other, thus enabling to obtain an effect similar to that of the above-described embodiment. In addition, by using a non-contact scheme utilizing the magnetic force, depression and deterioration of durability due to fatigue and aging can be reliably prevented from occurring, and part replacement also becomes unnecessary.

(1-3) Case of using rubber member

Figure 9A:
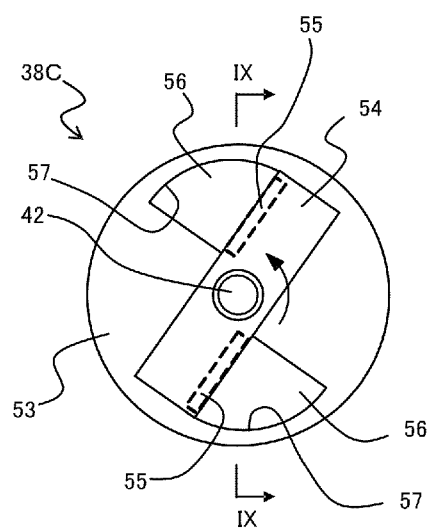
FIG. 9A is an elevational view of the twist mechanism in a modified example where return force is obtained by a rubber member.
Figure 9B:
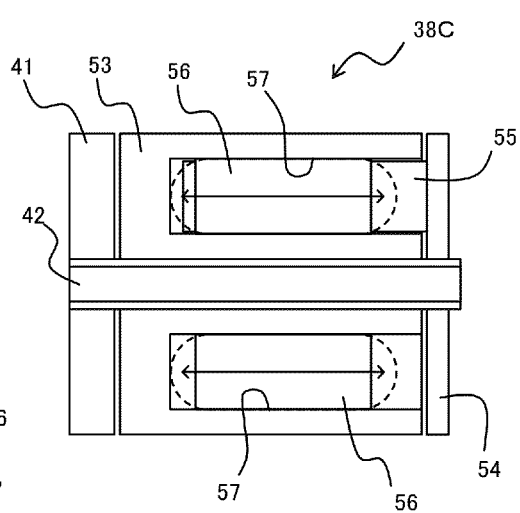
FIG. 9B is a sectional side view taken along a cross section IX-IX in FIG. 9A.

In addition, the above-described return force may be obtained using a rubber member. In FIGS. 9A and 9B, a twist mechanism 38C of the modified example has: the shaft support plate 41; the shaft 42; a rubber member storage body 53; a coupling member 54, two pressing members 55, and two rubber members 56. The shaft support plate 41 and the shaft 42 are formed and fixed equal to those of the above-described embodiment, respectively. The whole rubber member storage body 53 is formed in a columnar shape with a substantially same diameter as that of the shaft support plate 41, and the shaft 42 penetrates an axial center of the rubber member storage body 53 to be supported rotatably.

In addition, two arc-shaped deep grooves 57 that respectively make a same inner circumferential angle with the axial center of the rubber member storage body 53 are formed in the rubber member storage body 53, and a rubber member 56 having a substantially same arc shape as the deep groove 57 and formed long in the axial direction is stored inside each deep groove 57. Gap is provided among ends of the rubber member 56 and the deep groove 57 corresponding to one another in a combination thereof, and the pressing member 55 with a flat plate shape is inserted in the gap, respectively. An end on the fingertip side (the front side in FIG. 9A, and the right side in FIG. 9B) of each pressing member 55 projects from an end of the rubber member storage body 53, respectively, and it is fixed to a free end of the shaft 42 through the coupling member 54 with a flat plate shape. Additionally, when the twist mechanism 38C of the modified example is provided inside the first link 16, the shaft support plate 41 is fixed to the first small link 35 (together with the shaft 42 and the pressing member 55), and the rubber member storage body 53 is fixed to the second small link 36. It is to be noted that the rubber member 56 corresponds to one example of the return force providing member described in each claim.

In the coupling member 54 and the two pressing members 55 rotating around the axis of rotation of the shaft 42 together with the shaft 42, the two pressing members 55 press each rubber member 56 in the rotational direction in the deep grooves 57, respectively. In this case, restoring force of each rubber member 53 provides to each pressing member 55, the coupling member 54, the shaft 42, and the shaft support plate 41 biasing force of displacing them in the reverse rotation direction, respectively. It is to be noted that each pressed rubber member 56 is elastically deformed so as to extend along a direction of the axis of rotation as shown with a dashed line in FIG. 9B, and that this amount of elastic deformation is decided by a Poisson's ratio of a material of the rubber member 56.

As described above, in the modified example, passive stable grasping operation and return to the original state after grasp release can be performed utilizing the return force of the rubber member 56 after elastic deformation, thus enabling to obtain an effect similar to that of the above-described embodiment. In addition, since the rubber member 56 is provided with not only elasticity but viscosity, some degree of guide function and restriction function for amount of rotation with respect to the relative rotation of the two small links 35 and 36 can also be fulfilled. In this case, it is also possible to omit the guide bar 45 and the guide groove 47 in the above-described embodiment. It is to be noted that a resin member capable of similar elastic deformation can also be substituted for the above-described rubber member 56.

<Second Embodiment>

Next, a second embodiment will be explained. In the embodiment, a robot hand can grasp an object in an enclosing manner in any posture by providing auxiliary torque by a spring member.

Since configurations of the robot device 1 and the robot body 2 provided with a robot hand 108 in accordance with the embodiment are similar to those of the above-mentioned first embodiment (FIG. 1), explanation thereof will be omitted.

Figure 10:
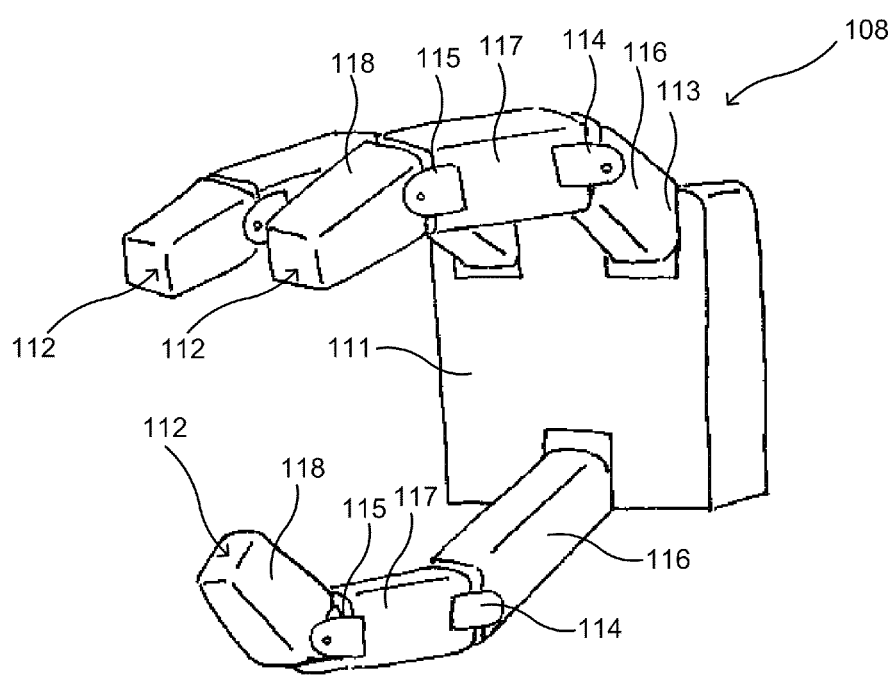
FIG. 10 is a perspective view representing an external structure of a robot hand in accordance with a second embodiment.

In FIG. 10, the robot hand 108 has a palm portion 111 and three finger portions 112 having bases coupled to the palm portion 111. In each finger portion 112, three links 116, 117, and 118 are coupled in series through two second joint 114 and third joint 115 that are configured with hinges, respectively, further, the link 116 of the base side is coupled to the first joint 113, and each finger portion 112 can perform flexion and extension operation like oscillation on one flat surface. The three finger portions 112 are flexed so as to be close to one another, and thereby the robot hand 108 can grasp the object 9 with the three links 116, 117, and 118 and finger pads of the three finger portions 112. Additionally, the robot hand 108 of the embodiment is provided with an underactuated mechanism that interlockingly drives adjacent two joints of the above-described three finger portions 112 by one electric motor.

Figure 11:
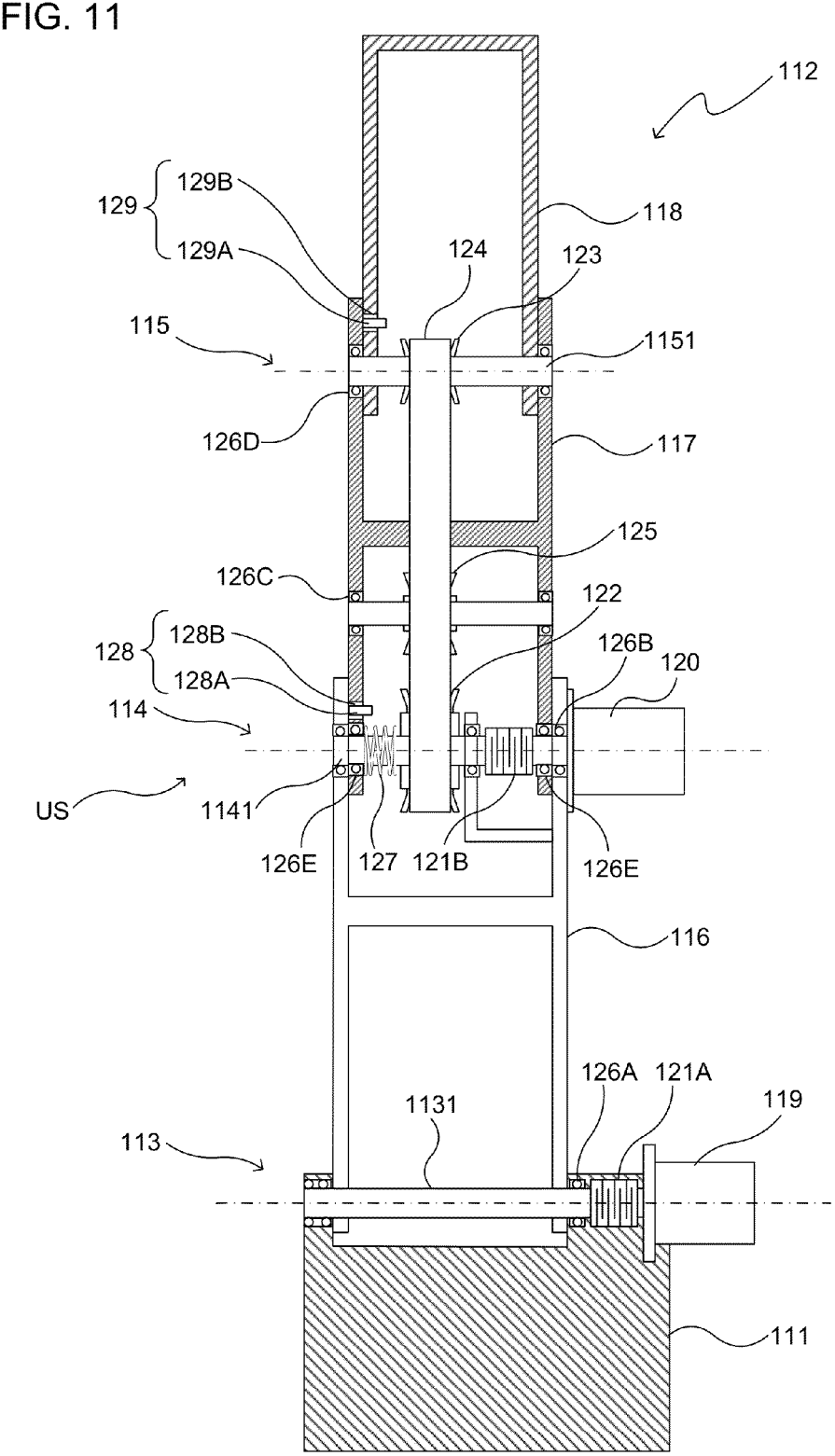
FIG. 11 is a longitudinal sectional view showing an internal structure of a whole finger portion provided with an underactuated mechanism.

Next, an internal structure of the whole finger portion 112 provided with the above-mentioned underactuated mechanism will be explained using FIG. 11. It is to be noted that FIG. 11 shows a skin of a part of the palm portion 111 with the hollow structure and the each links 116, 117, and 118. FIG. 11 shows a state where a wall portion, etc. are appropriately omitted.

In FIG. 11, a base of the first link 116 is fixed to a first joint shaft 1131 provided at an edge portion of the palm portion 111, and the first joint shaft 1131 and an output shaft of a first motor 119 (actuator) are coupled by a coupling 121A. The first joint shaft 1131 is rotatably supported by a bearing 126A provided at the palm portion 111. According to such a configuration, the whole finger portion 112 is oscillated (flexed and extended) at the first joint 113 with respect to the palm portion 111 by torque generated by the first motor 119.

A second motor 120 (actuator) is installed on the fingertip side of the first link 116. An output shaft of the second motor 120 and a second joint shaft 1141 are coupled by a coupling 121B. The second joint shaft 1141 is rotatably supported by a bearing 126E provided at a base of the second link 117, and a bearing 126B provided at the first link 116. In addition, a drive pulley 122 is fixed to the second joint shaft 1141, and rotation angles of the drive pulley 122 and the second joint shaft 1141 coincide with each other.

The third link 118 is coupled to a fingertip side of the second link 117. A base of the third link 118 is fixed to a third joint shaft 1151. The third joint shaft 1151 is rotatably supported by a bearing 126D provided at the fingertip side of the second link 117. A driven pulley 123 is provided at the third joint shaft 1151. A belt 124 is spanned between the drive pulley 122 and the driven pulley 123, and torque of the drive pulley 122 is transmitted to the driven pulley 123 through the belt 124. An idle pulley 125 provided at an intermediate portion of the second link 117 is also in contact with the belt 124. This idle pulley 125 plays a role to adjust tension of the belt 124. It is to be noted that the drive pulley 122, the driven pulley 123, and the belt 124 correspond to one example of a torque transmission mechanism described in the claims.

At a point where the first link 116 and the second link 117 overlap with each other in the second joint 114, provided is a stopper 128 that regulates posture of the second link 117 with respect to the first link 116. This stopper 128 is configured with a pin 128A provided at the first link 116, and a guide groove 128B provided at the second link 117. In addition, at a point where the second link 117 and the third link 118 overlap with each other in the third joint 115, a stopper 129 that regulates posture of the third link 118 with respect to the second link 117. This stopper 129 is configured with a pin 129A provided at the second link 117, and a guide groove 129B provided at the third link 118.

Figure 12:
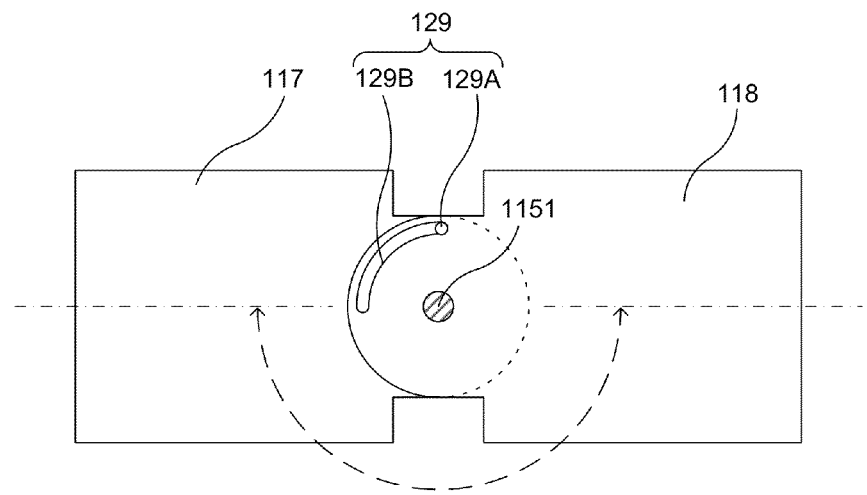
FIG. 12 is a schematic view showing one example of a configuration of a stopper in a state where a link is extended.
Figure 13:
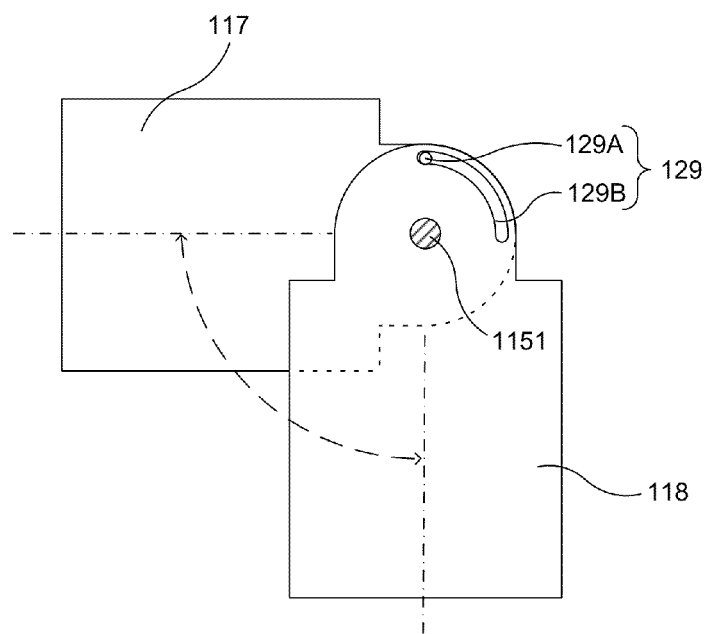
FIG. 13 is a schematic view showing one example of the configuration of the stopper in a state where the link is flexed.

One example of a configuration of the stopper 129 will be explained with reference to FIGS. 12 and 13. In these FIGS. 12 and 13, at a point where the second link 117 and the third link 118 overlap with each other, the pin 129A is installed upright inside the second link 117. At a point where the third link 118 and the second link 117 overlap with each other, the guide groove 129B is provided at the third link 118 so as to be parallel to an outer circumference centering on the third joint shaft 1151, and is configured so as to be able to restrict an operation range of the inserted pin 129A. Namely, the stopper 129 regulates posture of the third link 118 with respect to the second link 117 so that an axial line of the second link 117 and an axial line of the third link 118 do not extend to not less than 180 degrees centering on the third joint shaft 1151 as shown in FIG. 12, and so that the axial line of the second link 117 and the axial line of the third link 118 are not flexed at an acute angle (for example, not more than 90 degrees) centering on the third joint shaft 1151 as shown in FIG. 13. It is to be noted that the stopper 128 also has the configuration similar to that of the above-described stopper 129.

Returning to FIG. 11, a coiled torsion spring 127 is provided around the second joint shaft 1141. Although illustration is omitted, one end of the torsion spring 127 is fixed to the first link 116, and the other end thereof is fixed to the second link 117. As a result, the torsion spring 127 provides auxiliary torque to the second joint 114 so that drive torque required for driving the second joint 114 is smaller than drive torque required for driving the third joint 115 in grasping operation being performed, and so that the drive torque required for driving the second joint 114 is larger than the drive torque required for driving the third joint 115 in grasp release operation being performed.

Figure 14:
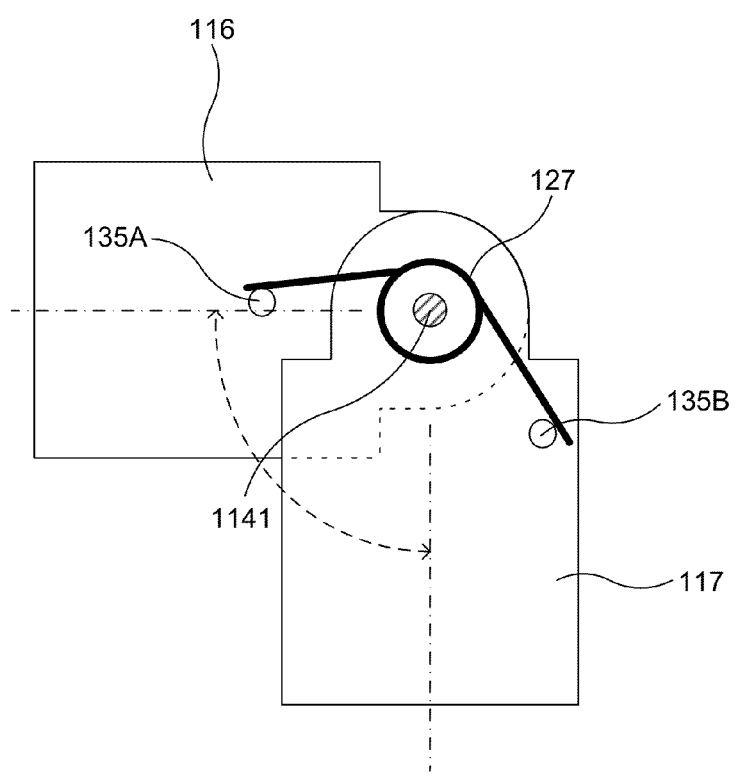
FIG. 14 is a schematic view showing one example of a configuration of a torsion spring.

One example of a configuration of the torsion spring 127 will be explained (FIG. 14). It is to be noted that illustration of the stopper 128 is omitted in FIG. 14. In FIG. 14, the torsion spring 127 is inserted around the second joint shaft 1141. One of free ends of the torsion spring 127 is fixed to a pin 135A provided inside the first link 116, and another free end of the torsion spring 127 is fixed to a pin 135B provided inside the second link 117. The pins 135A and 135B are arranged so as to be in a state where the second link 117 is flexed, for example, at 90 degrees with respect to the first link 116 in a natural state where the second motor 120 is not turned on. It is to be noted that the torsion spring 127 corresponds to one example of a drive torque adjusting member described in the claims, and also corresponds to one example of the second spring member.

Next, operation of the finger portion 112 of the robot hand 108 in accordance with the embodiment will be explained with reference to FIG. 11. The motor 119 drives the first joint shaft 1131 and performs posture control of the first link 116, and the motor 120 drives the second joint shaft 1141 and the third joint shaft 1151. Since the motor 120, the second joint shaft 1141, and the third joint shaft 1151 are underactuated mechanisms, the motor 120 cannot arbitrarily perform angle control of the third joint shaft 1151. The underactuated mechanism is a mechanism with smaller actuator degree of freedom than a degree of freedom of an object to be controlled. A point where an input degree of freedom is smaller than this output degree of freedom is advantageous to following grasp (grasp so as to follow a shape of the object). In the embodiment, two joint shafts are provided for one motor. In an object grasping process, the motor 119 performs posture control of the first link 116 so that the first link 116 first approaches the object to be grasped 9. After the first link is controlled to be predetermined posture, the motor 120 drives the second link 117 and the third link so that the second link 117 and the third link 118 get contact with the object to be grasped 9. The underactuated mechanism (the motor 120 drives the second link 117 and the third link 118) of the embodiment will be explained in detail. When friction occurs among the drive pulley 122, the driven pulley 123, and the belt 124, and motor torque exceeding the friction is generated, the third link 118 rotates around the third joint shaft 1151. This will be called rotation operation. When motor torque smaller than the friction is generated, the second link 117, the third link 118, the belt 124, the drive pulley 122, and the driven pulley 123 integrally rotate around the second joint shaft 1141. This will be called revolution operation. By the rotation operation and the revolution operation, two joints can be driven by one motor. When speed control of the second motor 120 is performed, and the output shaft of the second motor 120 rotates clockwise seen from the right side in FIG. 11 (in a paper-based depth direction of a fingertip side in FIG. 11), the second joint shaft 1141 and the drive pulley 122 similarly rotate clockwise through the coupling 121B. When the revolution operation is continued until the second link 117 gets contact with the object to be grasped 9, and the second link 117 gets contact with the object to be grasped 9, motor velocity deviation becomes large, and therefore torque exceeding friction is generated so that the velocity deviation becomes small, and the revolution operation is shifted to the rotation operation. That is, after the second link 117 gets contact with the object to be grasped 9, the third link 118 is flexed toward the object. By a series of operation (rotation operation and revolution operation), the finger portion 112 of the present disclosure grasps the object to be grasped 9 following the shape of the object.

An order with which each link (the second link 117 and the third link 118) starts to move is important in order to stably grasp the object to be grasped 9 with the hand, and an order during flexion operation is carried out with the third link 118 after the second link 117, and an order during extension operation is carried out with the second link 117 after the third link 118. The torsion spring 127 and the stopper 129 are provided in order to reliably perform the operation. It is to be noted that the second link 117 may start extension in the middle of extension of the third link 118.

First, a reason why the torsion spring 127 is provided around the second joint shaft 141 will be explained. The torsion spring 127 works with little torque at the time of flexion operation so that the third link 118 starts to move after the second link 117, and works so that the second link 117 starts to move after the third link 118 unless large torque is provided at the time of extension operation. By addition of the torsion spring 127, desired flexion and extension operation can be achieved even in any posture. The stopper 129 is a part required for extension operation, and if a torsion spring is added and there is no stopper 129, only the third link 118 works and the second link cannot be moved. That is, desired extension operation cannot be realized without the stopper 129. Further, in the second link 117 continuing extension operation, the stopper 128 restricts the second joint shaft 1141 so that an angle between the second link 117 and the first link 116 does not become not less than a certain set angle (for example, 180 degrees) centering on the second joint shaft 1141.

Next will be explained an initial posture control method in driving the second motor 120. By biasing force of the torsion spring 127, the second link 117 is in flexion posture (posture in a grasp direction) when a brake is not applied in a case where power supply of the second motor 120 is not on. Namely, an initial state of the second link 117 corresponds to the flexion posture under the influence of the torsion spring 127. However, when grasping the object, the second link 117 and the third link 118 is preferably in extension posture. Consequently, a voltage command is issued from the PC3 to the second motor 120 so as to rotate counterclockwise seen from the right side in FIG. 11 (in a paper-based front direction of a fingertip side in FIG. 11), and torque that resists the biasing force of the torsion spring 127 is generated to carry out extension operation of the second link 117. At this time, extension operation of the third link 118 is stopped by the stopper 129 and further, extension operation of the second link 117 is stopped by the stopper 128. The state where the first link 116, the second link 117, and the third link 118 are extended in series is set as initial posture, and the state is stored in a memory of the PC3 as an initial angle 0 degree of the second motor 120. In addition, an angle before power-on and an angular difference (a rotation angle) at the time of being constrained by the stopper 128 are also stored in the PC3. An angular difference 0 is utilized to return the robot hand to the initial posture after the power-on, and the initial posture can be kept easily by issuing the angular difference as a target angle command.

According to the robot hand 108 in accordance with the second embodiment described above, the shape-fitting mechanism US having the drive pulley 122, the driven pulley 123, the belt 124, and the torsion spring 127 as the torque transmission mechanism is provided at the finger portion 112, and in performing grasping operation, flexion drive of the second joint 114 is performed prior to the third joint 115, and in performing grasp release operation, extension of the third joint 115 is driven prior to the second joint 114. The torsion spring 127 enough to hold self-weights of the second link 117 and the third link 118 is selected, and thereby flexible grasping following the shape of the object to be grasped 9 can be performed by the finger portion 112 even in any posture. In addition, even in any posture, flexion and extension can be switched only by the rotational direction of the second motor 120. Further, since the number of motors is only one, and there are few parts for transmission of force, weight reduction of the whole finger portion can be achieved, and high-speed operation of the fingers can also be performed.

In addition, particularly in the embodiment, the stopper 129 that regulates the posture of the third link 118 with respect to the second link 117 is provided at the finger portion 112. As a result, in carrying out grasp release operation, the third link 118 first starts extension, operation of the third link 118 is stopped at a predetermined angle and subsequently, the second link 117 can be extended. Namely, extension operation of the second link 117 can be reliably started after the extension of the third link 118.

It is to be noted that the present disclosure is not regulated to the above-described embodiment, and that various modifications can be made without departing from the subject matter and the technical idea of the disclosure. Hereinafter, such modified examples will be explained in order.

(2-1) Case of arranging second motor in link

Although in the above-described second embodiment, the second motor 120 is arranged outside the second link 116 so that the output shaft of the second motor 120 and the second joint shaft 1141 coincide with each other, it is more preferable for the second motor 120 to be arranged so as not to interfere with the other finger portions 112. Accordingly, the second motor 120 may be arranged inside the first link 116. The modified example will be explained with reference to FIG. 15. However, only components related to arrangement of the second motor 120 will be explained.

Figure 15:
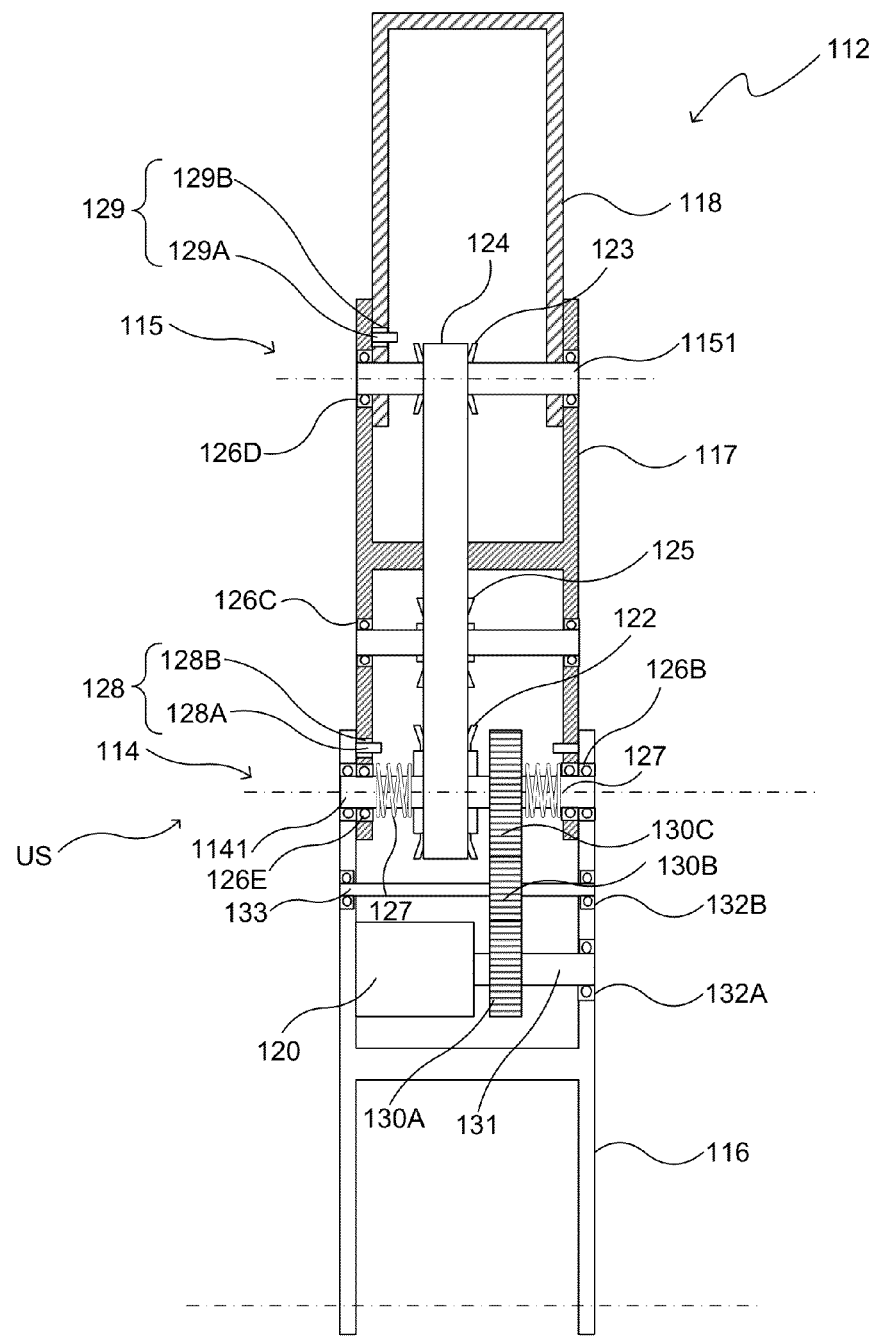
FIG. 15 is a longitudinal sectional view of an internal structure of a whole finger portion in a modified example where a second motor is arranged in a link.

In FIG. 15, the second motor 120 of the modified example is fixed to the inside of the first link 116. An output shaft 131 of the second motor 120 is supported by a bearing 132A arranged at the skin of the first link 116, and a gear 130A is coupled to this output shaft 131. A gear 130C is coupled to the second joint shaft 1141 in parallel with the drive pulley 122. A gear 130B (idle gear) is arranged inside the first link 116 so as to mesh with these gears 130A and 130C. An idle gear shaft 133 that is coupled to the gear 130B is supported by a bearing 132B arranged at the skin of the first link 116. The other configurations are similar to those of the above-described second embodiment.

Next, operation will be explained. When the output shaft 131 of the second motor 120 rotates clockwise seen from the right side in FIG. 15 (in a paper-based depth direction of a fingertip side in FIG. 15), the gear 130A similarly rotates clockwise, and the gear 130B meshing with the gear 130A rotates counterclockwise. The gear 130C meshing with the gear 130B rotates clockwise. As a result, the second joint shaft 1141 coupled to the gear 130C also rotates clockwise. Subsequent operation is similar to that of the above-mentioned second embodiment, and the second link 117 and the third link 118 are flexed in the paper-based depth direction in that order, and take operation to grasp the object to be grasped 9. In addition, when the second motor 120 rotates counterclockwise seen from the right side in FIG. 15 (in a paper-based front direction on the fingertip side in FIG. 15), the second joint shaft 1141 rotates counterclockwise together with the gear 130C similarly to the above. As a result, the third link 118 and the second link 117 extend in the paper-based front direction in that order.

Also according to the modified example, an effect similar to that of the above-described second embodiment is obtained. In addition, since the torsion spring 127 can be installed both ends of the second joint shaft 1141 as shown in FIG. 15 because of unnecessity of providing the coupling 121B, auxiliary torque can be increased. It is to be noted that although in the modified example, the gear 130B is provided n order to make the same a rotational direction of the second motor 120 and rotational directions of the second joint 114 and the third joint 115, the gear 130B may be eliminated fit is not necessary to coincide the rotational directions thereof. In this case, further weight reduction can be achieved.

(2-2) Case of arranging second motor and worm gear in link

The modified example is an example where a worm gear is used instead of a spur gear in the configuration of the above-described modified example (2-1). The modified example will be explained with reference to FIG. 16.

Figure 16:
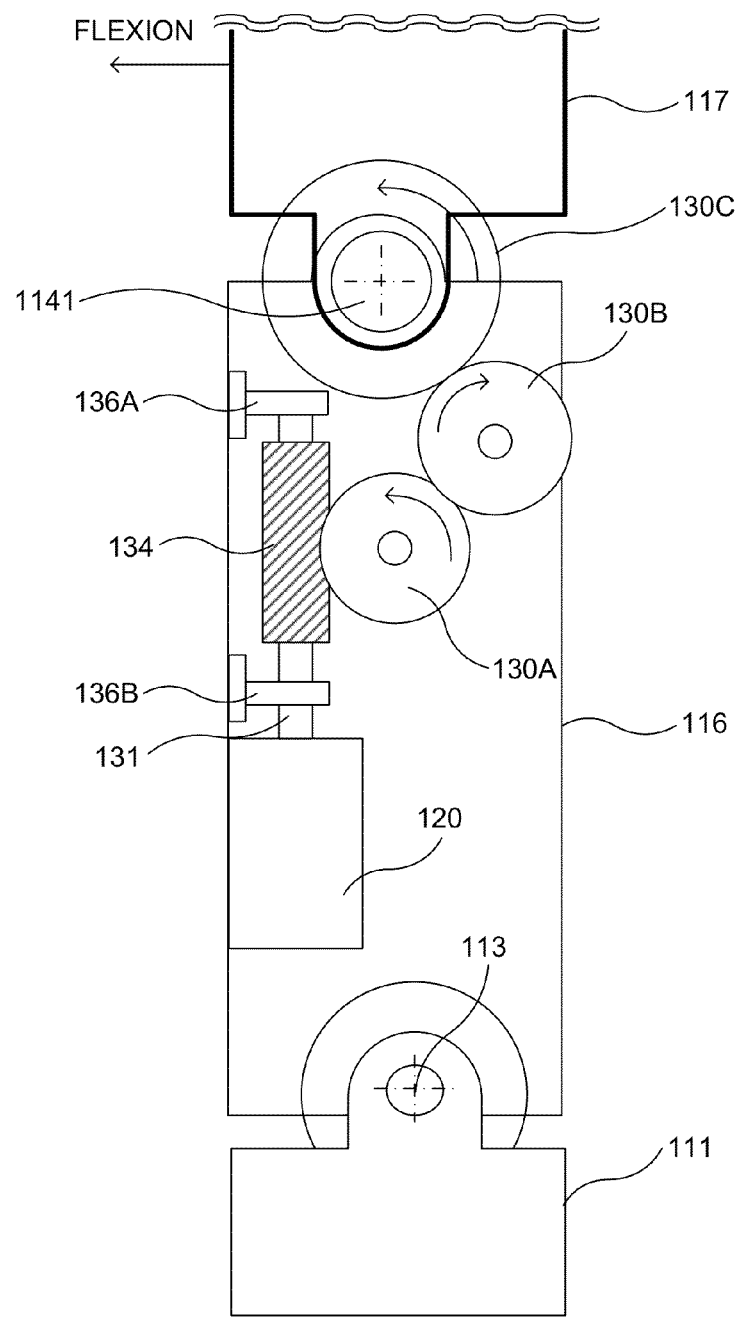
FIG. 16 is a longitudinal sectional view of an internal structure of a whole finger portion in a modified example where the second motor is arranged in the link using a worm gear.

In FIG. 16, the second motor 120 is arranged inside the first link 116 so that an axial direction thereof may conform to a link longitudinal direction. The output shaft 131 of the second motor 120 is coupled to a worm 134, and this worm 134 is supported by bearings 136A and 136B installed inside the first link 116. The gear 130A is arranged so as to mesh with the worm 134, and the gear 130B is arranged inside the first link 116 so as to mesh with the gears 130A and 130C. The gear 130C is coupled to the second joint shaft 1141 in parallel with the drive pulley 122 similarly to the one explained in the above-described modified example (2-1).

Next, operation will be explained. When the worm 134 rotates counterclockwise seen from the upper side in FIG. 16 by drive of the second motor 120, the gear 130A rotates counterclockwise, the gear 130B clockwise, and the gear 130C counterclockwise. As a result, when the second joint shaft 1141 rotates counterclockwise similarly to the gear 130C, the second link 117 and the third link 118 are flexed. On the contrary, when the worm 134 rotates clockwise seen from the upper side in FIG. 16, the second link 117 and the third link 118 are extended.

Also according to the modified example, an effect similar to that of the above-described second embodiment is obtained. In addition, by using the worm 134, an effect of reducing power consumption of the second motor 120 for keeping the posture of the second link 117 and the third link 118 can also be obtained.

(2-3) Case of providing auxiliary torque by tension spring

Although the torsion spring 127 provides auxiliary torque to the second joint 114 in the above-described second embodiment, a tension spring may be used instead of the torsion spring 127. The modified example will be explained with reference to FIG. 17.

Figure 17:
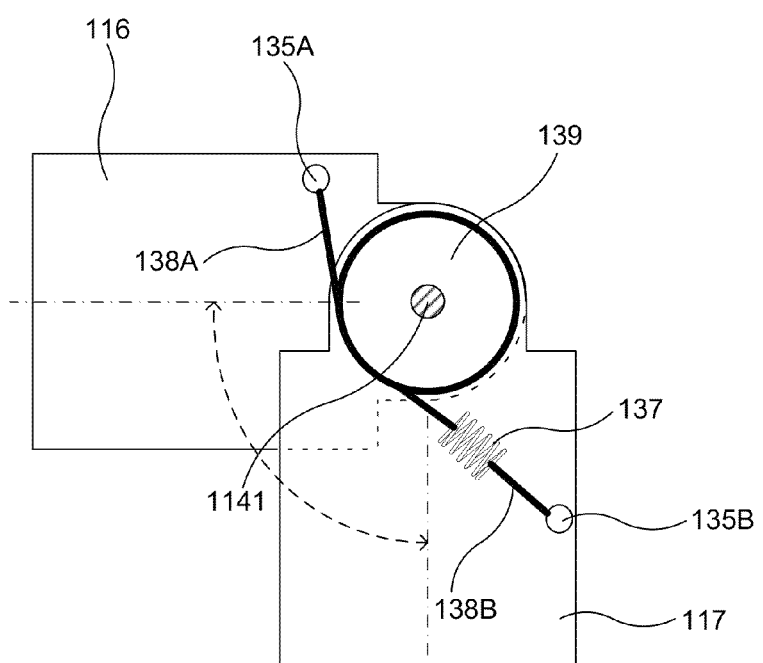
FIG. 17 is a schematic view representing one example of a modified example using a tension spring.

In FIG. 17, one end of a first wire 138A is fixed to the pin 135A provided inside the first link 116, and the other end of the first wire 138A is coupled to an end of a coiled tension spring 137. Another end of the tension spring 137 is coupled to a second wire 138B, and the second wire 138B is fixed to the pin 135B provided inside the second link 117. Apart of the first wires 138A is in a state of being in contact with a pulley 139 rotatably supported by the second joint shaft 1141. This pulley 139 is installed in parallel with the drive pulley 122. In this case as well, as for natural state posture when the second motor 120 is not turned on, the pins 135A and 135B are arranged so as to be in a state where the second link 117 is flexed at 90 degrees with respect to the first link 116. Also according to the modified example, an effect similar to that of the above-described second embodiment is obtained. It is to be noted that the tension spring 137 corresponds to one example of the drive torque adjusting member described in the claims, and also corresponds to one example of the second spring member.

(2-4) Case of having finger portion configured with two links

Although the case where each finger portion 112 is configured with the three links 116, 117, 118, respectively has been explained as one example in the above-described second embodiment, the shape-fitting mechanism US may be provided for a finger portion configured with two links The modified example will be explained with reference to FIGS. 18 to 21.

Figure 18:
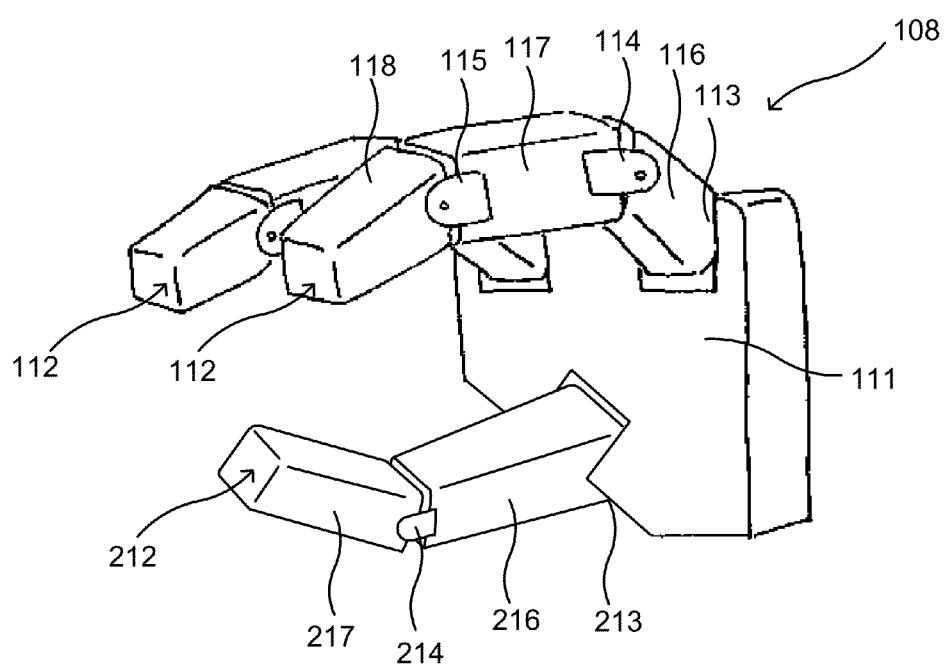
FIG. 18 is a perspective view showing an external structure of a robot hand in a modified example where the robot hand has a finger portion configured with two links.

In FIG. 18, the robot hand 108 has such a configuration that the finger portion 212 corresponding to a thumb couples two links 216 and 217 in series through the second joint 214, and that the link 216 on the palm side is coupled to the palm portion 111 through the first joint 213. Configurations of the other two finger portions 112 are the same as those of the above-described second embodiment. The finger portion 212 can perform flexion operation on one flat surface oblique to oscillating surfaces of the other finger portions 112. These three finger portions 112, 212 flex so as to be close to one another, and thereby the robot hand 108 can grasp the object to be grasped 9.

Figure 19:
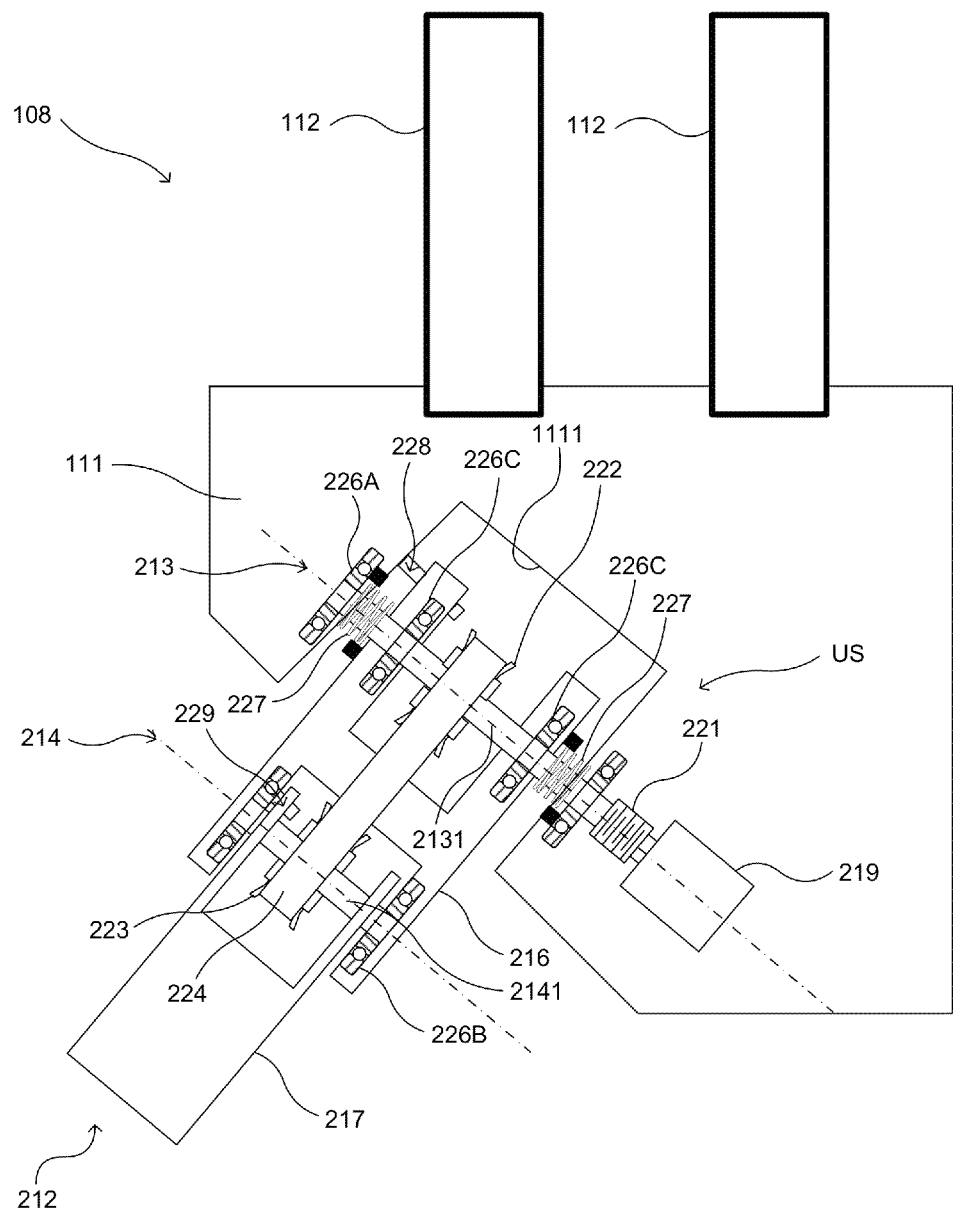
FIG. 19 is a longitudinal sectional view showing an internal structure of the whole finger portion configured with the two links.

In FIG. 19, at the edge portion of the palm portion 111, an output shaft of the first motor 219 (actuator) and a first joint shaft 2131 are coupled to each other by a coupling 221. The first joint shaft 2131 is rotatably supported by a bearing 226A provided at the palm portion 111 and a bearing 226C provided at the first link 216. According to such a configuration, the whole finger portion 212 is flexed at the first joint 213 with respect to the palm portion 111 by torque generated by the first motor 219.

A principle that the first joint shaft 2131 and a second joint shaft 2141 are respectively driven by the first motor 219 is similar to a principle in FIG. 11 that the second motor 219 drives the second joint shaft 1141 and the third joint shaft 1151, respectively.

The second link 217 is coupled to a fingertip side of the first link 216. A base of the second link 217 is fixed to the second joint shaft 2141. This second joint shaft 2141 is rotatably supported by a bearing 226B provided on the fingertip side of the first link 216. A driven pulley 223 is provided at the second joint shaft 2141. A belt 224 is spanned between a drive pulley 222 and the driven pulley 223, and torque of the drive pulley 222 is transmitted to the driven pulley 223 through the belt 224. It is to be noted that the drive pulley 222, the driven pulley 223, and the belt 224 correspond to one example of the torque transmission mechanism described in the claims.

A coiled torsion spring 227 is provided around both ends of the first joint shaft 2131. One end of each torsion spring 227 is fixed to the palm portion 111, and the other end thereof is fixed to the first link 216. Even though the hand 108 takes any posture, the torsion spring 227 acts so that the second joint shaft 2141 is driven subsequent to the first joint shaft 2131 at the time of flexion operation, and so that the first joint shaft 2131 is driven subsequent to the second joint shaft 2141 at the time of extension operation. The torsion spring 227 provides auxiliary torque to the first joint 213.

A stopper 228 that regulates posture of the first link 216 with respect to the palm portion 111 is provided at the first joint 213. This stopper 228 regulates the posture so that the palm portion 111 and the first link 216 do not extend to not less than 180 degrees centering on the first joint shaft 2131. It is to be noted that at the time of flexion operation of the first link 216, the first link 216 gets contact with an end surface 1111 of the palm portion 111, and thereby the posture is regulated so that the palm portion 111 and the first link 216 do not flex at an acute angle (for example, not more than 90 degrees). At a point where the first link 216 and the second link 217 overlap with each other in the second joint 214, a stopper 229 that regulates posture of the second link 217 with respect to the first link 216. This stopper 229 regulates posture so that the first link 216 and the second link 217 do not extend to not less than 180 degrees centering on the second joint shaft 2141, and they do not flex at an acute angle (for example, not more than 90 degrees). In addition, the stopper 229 acts to reliably drive the first joint shaft 2131 subsequent to the second joint shaft 2141 at the time of extension operation. Configurations of these stoppers 228 and 229 are the same as those of the above-mentioned stopper 128 and 129.

As described above, in the modified example, the shape-fitting mechanism US having the drive pulley 222, the driven pulley 223, the belt 224, and the torsion spring 227 as the torque transmission mechanism is provided at the finger portion 212, and drive torque required for driving the first joint 213 is adjusted, whereby it becomes possible to grasp the object to be grasped in an enclosing manner by the finger portions 212.

Figure 20:
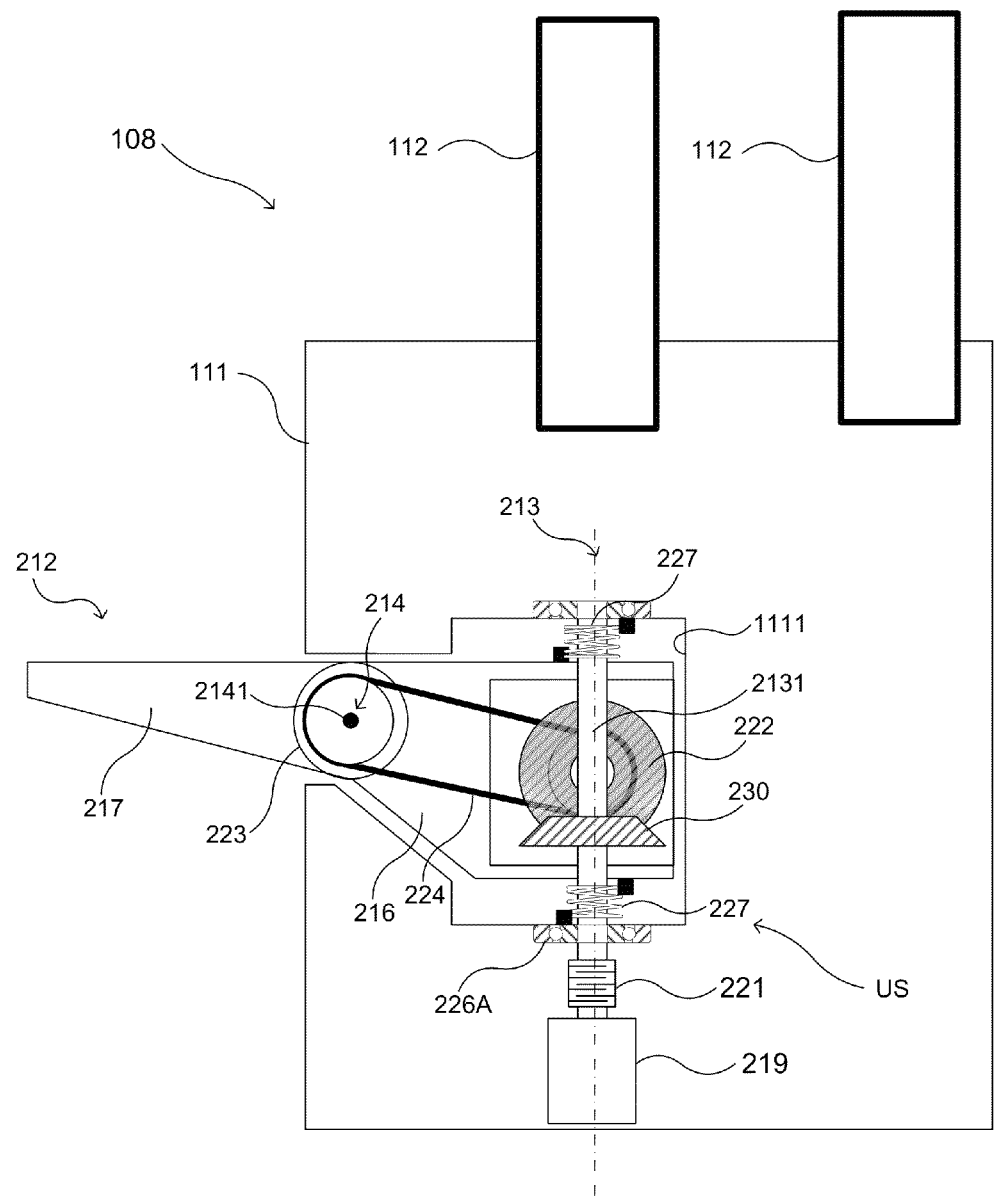
FIG. 20 is a longitudinal sectional view showing an internal structure of a finger portion configured with two links in an other configuration example.

Next, other configuration examples of the finger portion 212 will be explained using FIGS. 20 and 21. Although the finger portion 212 corresponding to the thumb of the robot hand 108 has such a configuration that the two links 216 and 217 are coupled to each other in an example shown in FIG. 20, unlike the example shown in FIG. 19, the first link 216 on the palm side is flexed on a flat surface substantially perpendicular to oscillating flat surfaces of the other two finger portions 112 through the first joint 213, and the second link 217 can perform flexion operation through the second joint 214 on a flat surface parallel to the oscillating flat surface of the finger portion 112.

A bevel gear 230 is provided at the first joint shaft 2131 coupled to an output shaft of the first motor 219 by the coupling 221. This bevel gear 230 similarly meshes with the bevel gear-shaped drive pulley 222. The belt 224 is spanned between the drive pulley 222 and the driven pulley 223 provided at the second joint shaft 2141, and torque of the drive pulley 222 is transmitted to the driven pulley 223 through the belt 224. It is to be noted that a point where the coiled torsion spring 227 is provided around the first joint shaft 2131, and a point where the stoppers 228 and 229 are provided at the first joint shaft 213 and the second joint shaft 214 are similar to the configuration shown in FIG. 19.

Figure 21A:
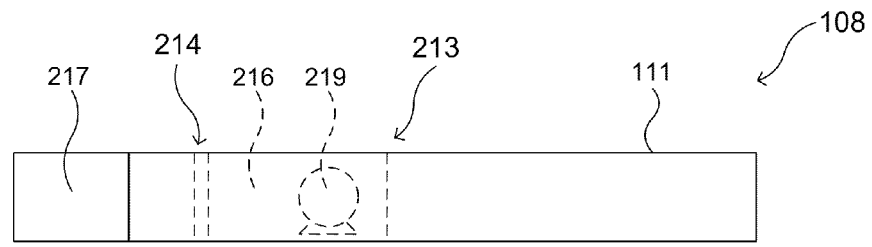
FIGS. 21A to 21C are views for explaining operation of the finger portion configured with the two links in the other configuration example.
Figure 21B:
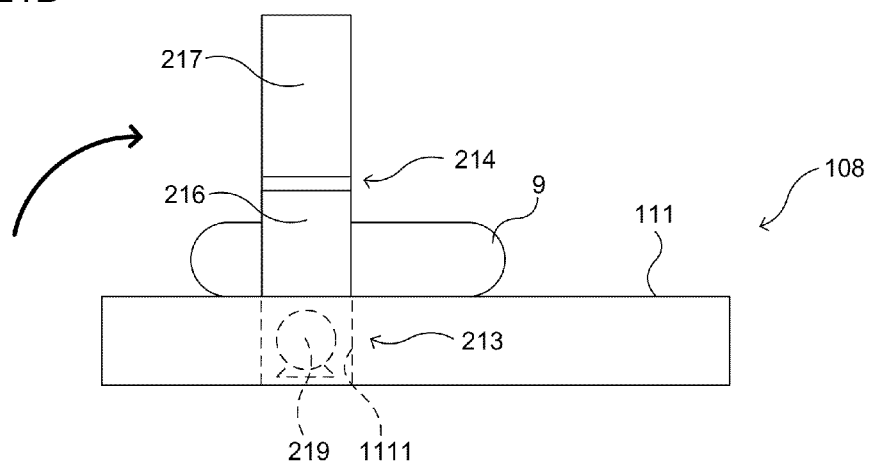
Figure 21C:
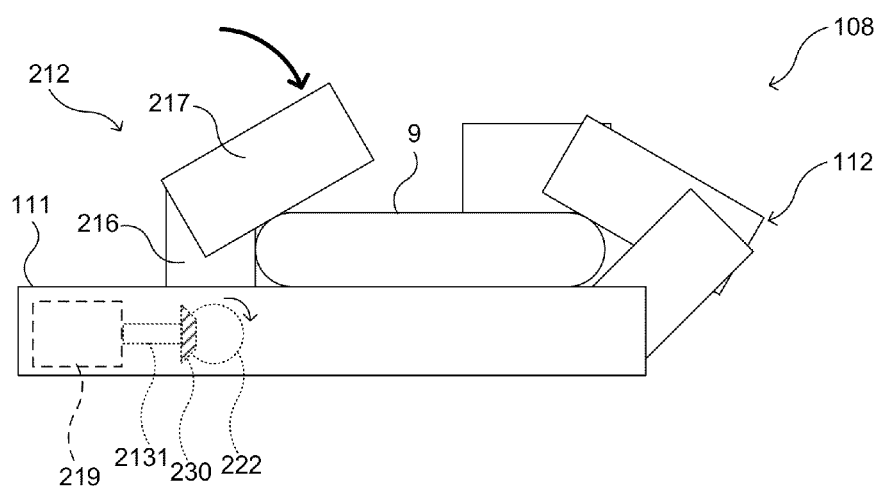

Next, operation of the finger portion 212 will be explained also with reference to FIGS. 21A to 21C. It is to be noted that FIGS. 21A and 21B are views of the robot hand 108 seen from a wrist direction (lower side in FIG. 20), and that FIG. 21C is a view thereof seen from a side surface direction (right side in FIG. 20). When the output shaft of the first motor 219 rotates clockwise seen from the lower side in FIG. 20 (clockwise in FIGS. 21A to 21C), the first joint shaft 2131 and the bevel gear 230 similarly rotate clockwise through the coupling 221. As a result, the first link 216 rotates together with the first joint shaft 2131, and the first link 216 is flexed from a state shown in FIG. 21A to the object to be grasped 9 side (paper-based front side in FIG. 20). When the palm portion 111 and the first link 216 make 90 degrees with each other by flexion operation, as shown in FIG. 21B, the first link 216 gets contact with the end surface 1111 of the palm portion 111, and thereby flexion operation of the first link 216 is stopped. Further, when the output shaft of the first motor 219 rotates clockwise, torque of the first motor 219 is transmitted from the bevel gear 230 to the driven pulley 223 through the drive pulley 222 and the belt 224, the second joint shaft 2141 rotates clockwise, and the second link 217 is flexed until it gets contact with the object to be grasped 9 as shown in FIG. 21C. In a manner described above, since the finger portion 212 contacts the second link 217 to the object to be grasped 9 subsequent to the first link 216, it turns out that the finger portion 212 has performed operation following the object to be grasped 9.

Also according to the modified example explained above, an effect similar to that of the above-described second embodiment is obtained.

(2-5) Case of having such configuration that inward rotation/outward rotation operation of finger portion can be performed Although inward rotation operation that brings the finger portions close to one another and outward rotation operation that keeps the finger portions away from one another do not considered in the above-described second embodiment, a configuration in which inward rotation/outward rotation operation can be performed may be employed in order that flexible grasping following a shape of an object to be grasped can be performed. The modified example will be explained with reference to FIGS. 22 to 29.

Figure 22:
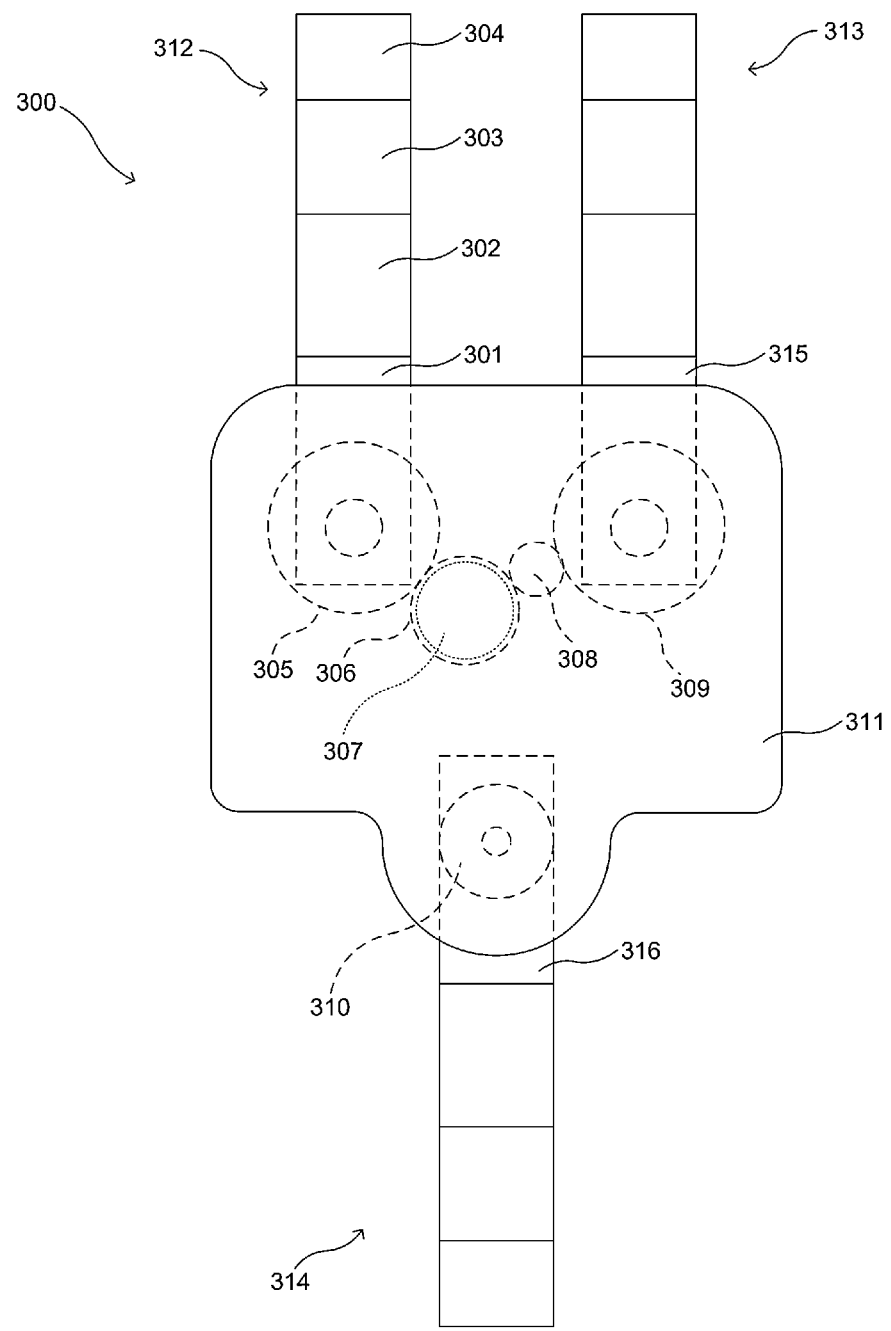
FIG. 22 is a plan view showing an external structure of a robot hand in a modified example having a configuration capable of inward rotation/outward rotation operation of a finger portion.

In FIG. 22, a robot hand 300 has a palm portion 311 and three finger portions 312, 313, and 314 having bases coupled to the palm portion 311. When the finger portion 312 is explained as one example, the finger portion 312 is configured with four links 301, 302, 303, and 304, and the adjacent links are coupled to one another. The base link 301 is coupled to a gear 305, and the gear 305 meshes with a gear 306. As a result, the base link 301 oscillates on a flat surface parallel to the palm portion 311 by a drive motor 307 of the gear 306. Similarly, a gear 309 coupled to a base link 315 of the finger portion 313 meshes with the gear 306 through a gear 308. As a result, a base link 315 oscillates on the flat surface parallel to the palm portion 311 by the drive motor 307. The gear 308 is provided so that rotational directions of the gear 305 and the gear 309 are opposite to each other (for example, so that the gear 309 rotates counterclockwise in the gear 305 rotating clockwise). The finger portion 314 oscillates on the flat surface parallel to the palm portion 311 by a drive motor 310 coupled to a base link 316.

By employing such a configuration, inward rotation/outward rotation operation of the two finger portions 312 and 313 can be achieved by the one drive motor 307. Accordingly, as compared with a case of respectively providing a drive motor at each finger portion, the number of motors can be reduced, thus resulting in cost reduction.

Figure 23:
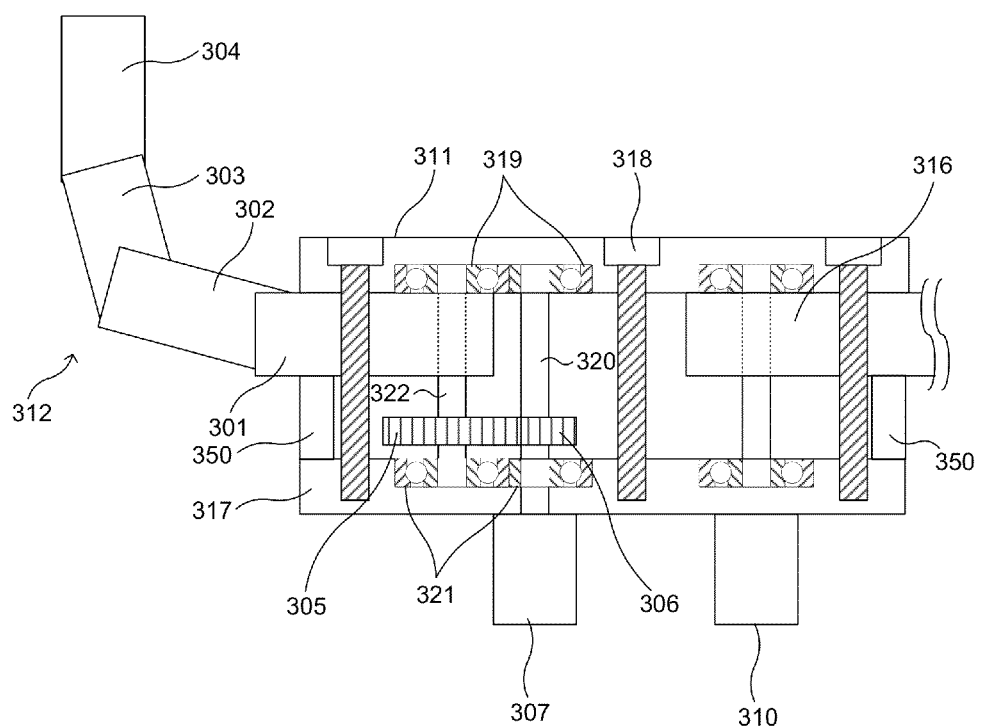
FIG. 23 is a sectional side view showing details of a palm portion of the robot hand in the modified example having the configuration capable of inward rotation/outward rotation operation of the finger portion.

Next, a structure of the palm portion 311 will be explained using FIG. 23. In FIG. 23, the base link 301 is arranged between the palm portion 311 and a back portion of the hand 317, and the above-described drive motor 307 and 310 are installed at the back portion of the hand 317. The palm portion 311 and the back portion of the hand 317 are fixed to each other with a plurality of bolts 318 with a spacer 350 being sandwiched therebetween. An output shaft of the drive motor 307 is coupled to a shaft 320, and this shaft 320 is supported by a bearing 319 provided inside the palm portion 311, and a bearing 321 provided inside the back portion of the hand 317. Meanwhile, a shaft 322 coupled to the base link 301 is also supported by the bearing 319 and the bearing 321. Additionally, the gear 306 coupled to the shaft 320 and the gear 305 coupled to the shaft 322 mesh with each other.

As described above, the drive motors 307 and 310 are arranged on the side of the back portion of the hand 317, and thereby motor replacement can be performed easily.

Figure 24:
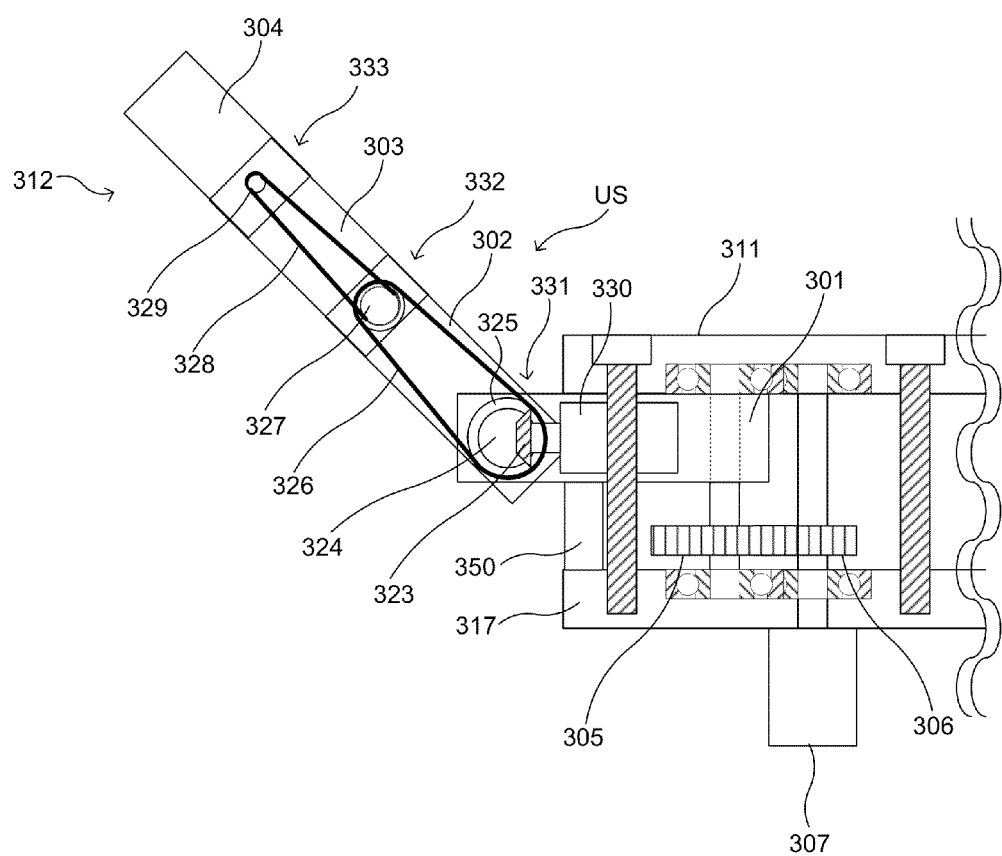
FIG. 24 is a sectional side view showing an internal schematic structure of the finger portion of the robot hand in the modified example having the configuration capable of inward rotation/outward rotation operation of the finger portion.

Next, a schematic structure of the inside of the finger portion will be explained using FIG. 24. It is to be noted that since the finger portions 313 and 314 have configurations similar to that of the finger portion 312, only the finger portion 312 will be explained here. A motor 330 (actuator) is arranged inside the base link 301, and an output shaft of the motor 330 is coupled to a bevel gear 323. The bevel gear 323 meshes with a bevel gear 324 arranged coaxially with a first joint pulley 325. In order to transmit drive force of the first joint pulley 325 to a second joint pulley 327, a belt 326 is spanned between the pulleys 325 and 327, and similarly, in order to transmit drive force of the second joint pulley 327 to a third joint pulley 329, a belt 328 is spanned between the pulleys 327 and 329. Rotational torque of the motor 330 works as force of flexing/extending each link.

Although detailed description is omitted, here, a torsion spring (not shown) is provided at a first joint 331 and a second joint 332 of the finger portion 312. As a result, the torsion spring provides auxiliary torque to the first joint 331 and the second joint 332 so that drive torque required for driving the first joint 331 is smaller than drive torque required for driving the second joint 332 and a third joint 333, and so that the drive torque required for driving the second joint 332 is smaller than the drive torque required for driving the third joint 333, in grasping operation being performed, and also so that the drive torque required for driving the first joint 331 is larger than the drive torque required for driving the second joint 332 and the third joint 333, and so that the drive torque required for driving the second joint 332 is larger than the drive torque required for driving the third joint 333, in grasp release operation being performed.

In addition, although illustration is omitted, the stoppers similar to those of the above-mentioned second embodiment are provided between the links 301 and 302, the links 302 and 303, and the links 303 and 304.

As described above, according to the modified example, the shape-fitting mechanism US having the pulleys 325, 327, and 329, the belts 326 and 328, and the torsion spring as the torque transmission mechanism is provided, and the torsion spring adjusts drive torque required for driving the joints 331, 332, and 333. As a result, in performing grasping operation, flexion of the first joint 331, the second joint 332, and the third joint 333 is driven in that order, and in performing grasp release operation, extension of the third joint 333, the second joint 332, and the first joint 331 is driven in that order. It is possible to grasp an object to be grasped in an enclosing manner by the finger portion 312 by the torsion spring even in any posture.

Figure 25:
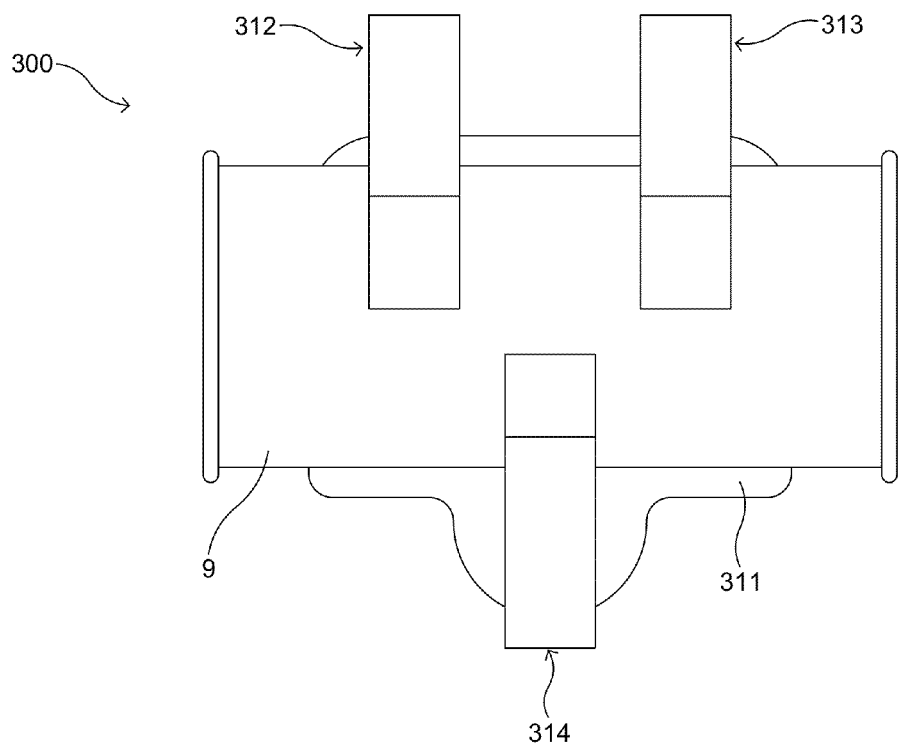
FIG. 25 is a top view showing a state of having grasped a large object to be grasped by a robot hand in the modified example having the configuration capable of inward rotation/outward rotation operation of the finger portion.
Figure 26:
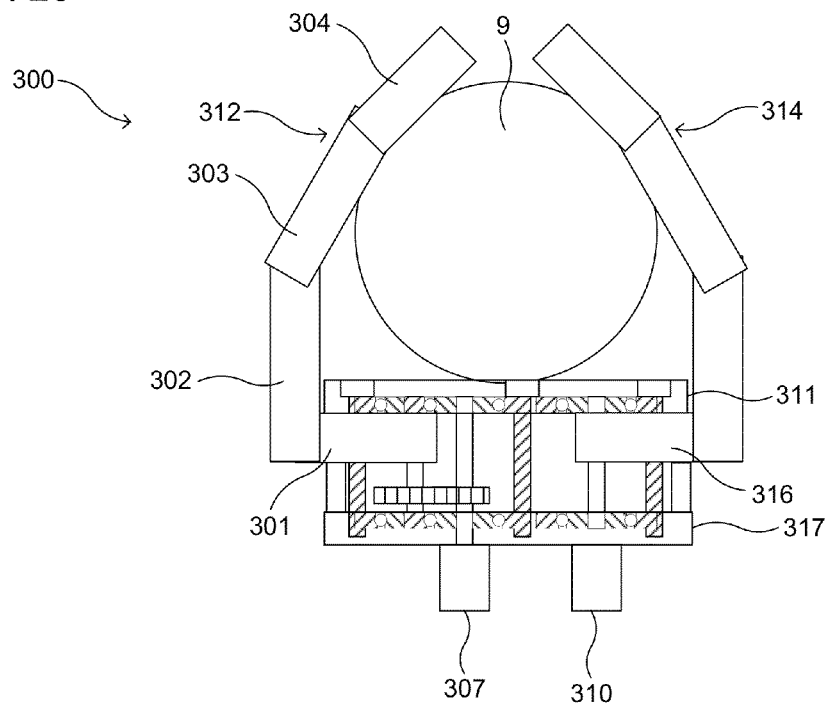
FIG. 26 is a side view showing the state of having grasped the large object to be grasped by the robot hand in the modified example having the configuration capable of inward rotation/outward rotation operation of the finger portion.

Next, operation of the robot hand 300 will be explained using FIGS. 25 to 28. In FIGS. 25 and 26, a state is shown where the comparatively large object to be grasped 9 has been grasped by the robot hand 300. An image of the object to be grasped 9 in this case is, for example, an empty can. In grasping a side surface of the object to be grasped 9 by the three finger portions 312, 313, and 314, each finger portion does not perform inward rotation/outward rotation operation, but first, the first link gets contact with a part of the palm, the second link gets contact with the can after the operation is completed, further the third link gets contact with another point of the can, and grasping operation is completed. As a result of it, the robot hand 300 grasps the empty can following a shape thereof.

Figure 27:
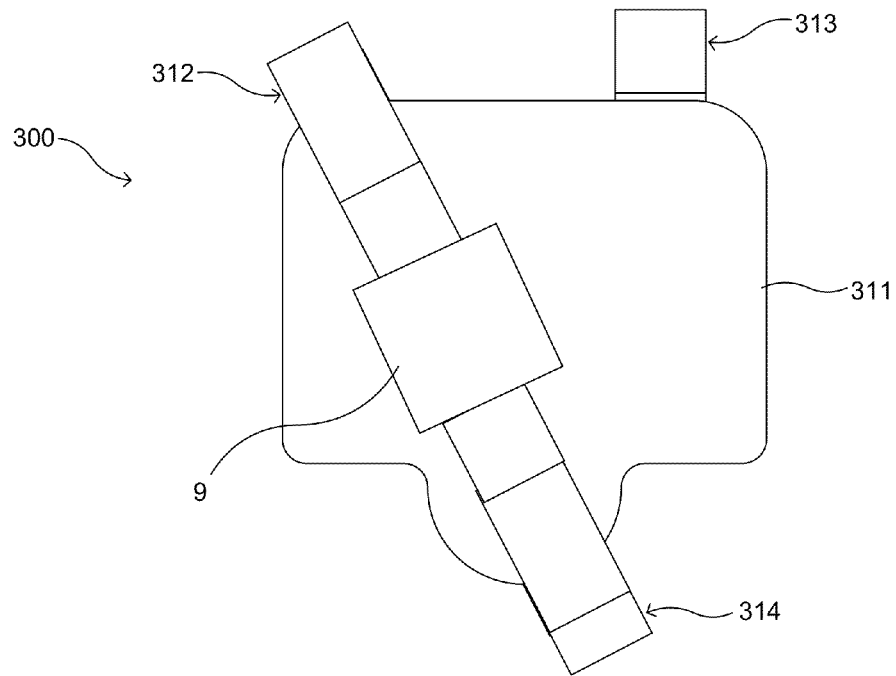
FIG. 27 is a top view showing a state of having grasped a small object to be grasped by the robot hand in the modified example having the configuration capable of inward rotation/outward rotation operation of the finger portion.
Figure 28:
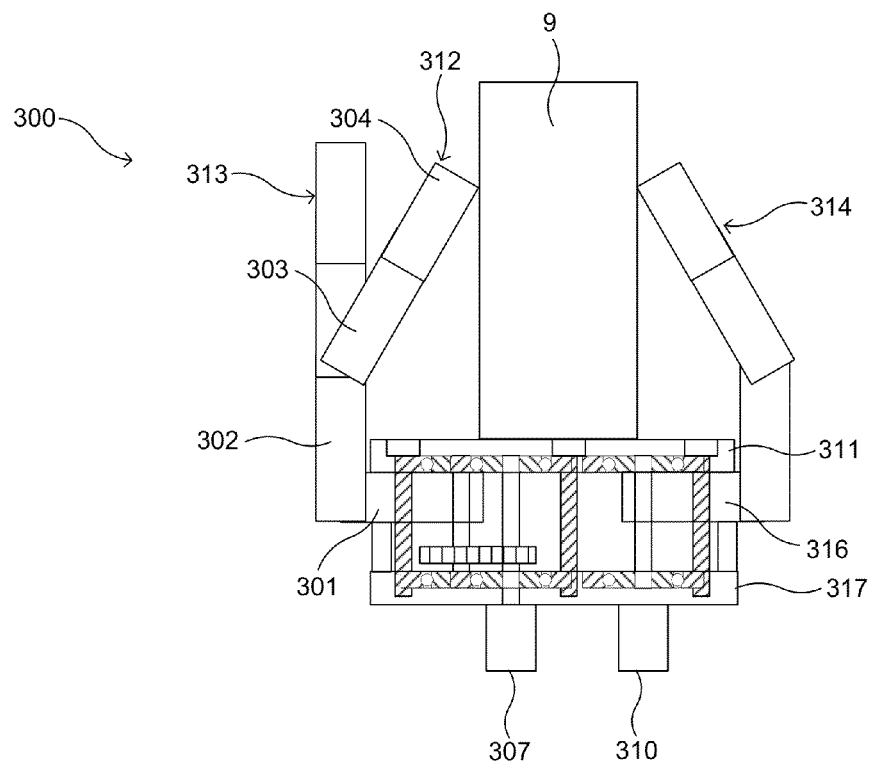
FIG. 28 is a side view showing a state of having grasped the small object to be grasped by the robot hand in the modified example having the configuration capable of inward rotation/outward rotation operation of the finger portion.

In FIGS. 27 and 28, a state is shown where the comparatively small object to be grasped 9 has been grasped by the robot hand 300. In this example, the object to be grasped 9 is an object having a rectangular parallelepiped shape, and is grasped by the two finger portions 312 and 314. In this case, the first links of the finger portions 312 and 314 get contact with a part of the palm, the second links do not get contact with the object to be grasped 9 after completion of the operation, the third links get contact with the object to be grasped 9, and grasping operation is completed.

It is to be noted that although the case where the object to be grasped 9 is grasped by the finger portions 312 and 314 has been shown as one example in the above, it may be grasped by the finger portions 313 and 314, or it may be grasped by the finger portions 312 and 313 after performing outward rotation of the finger portions 312 and 313 so that an angle therebetween is made to be 180 degrees.

According to the modified example explained above, similarly to the above-mentioned second embodiment etc., it is possible to grasp the object to be grasped 9 in an enclosing manner by the finger portions 312, 313, and 314 even in any posture. As a result of it, the robot hand 300 can perform flexible grasping following the shape of the object to be grasped 9 with respect thereto. In addition, since three joints are driven by one motor, a weight of the finger portion can be reduced more than in the above-mentioned second embodiment, and cost can be reduced.

Figure 29:
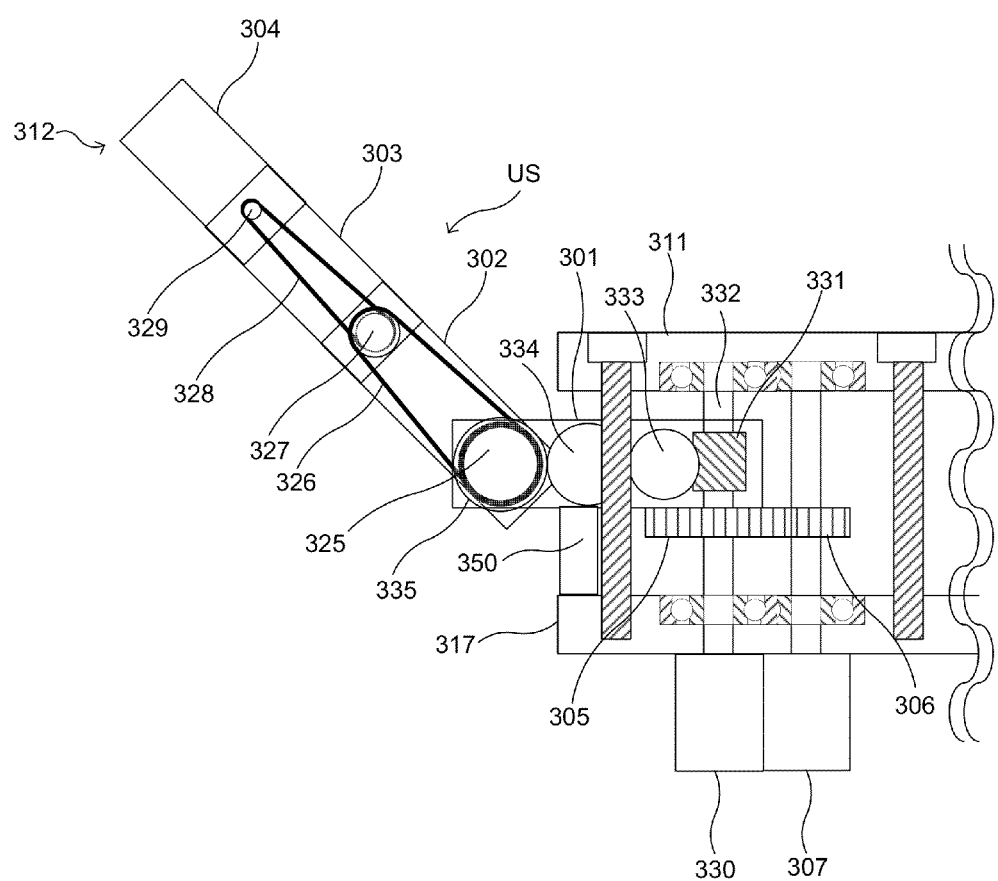
FIG. 29 is a sectional side view showing a configuration in which a motor is arranged at a back portion of a hand in the modified example having the configuration capable of inward rotation/outward rotation operation of the finger portion.

Next, an other configuration example of the robot hand 300 will be explained using FIG. 29. Although the motor 330 that oscillates (flexes and extends) the finger portion is incorporated in the base link 301 in the above-described modified example, it is better to arrange the motor 330 outside the finger portion 312 for weight reduction of the finger portion 312. In FIG. 29, the motor 330 installed at the back portion of the hand 317 is coupled to the shaft 332, and on an axis of this shaft 332, a worm 331 is coupled in the base link 301. Inside the base link 301, a worm wheel 333 is arranged so as to mesh with the worm 331. In addition, a gear 334 is arranged in the middle of the inside of the base link 301 in order to transmit rotation of the worm wheel 331 to the first joint pulley 325. The gear 334 meshes with a gear 335 arranged to be coaxial with the first joint pulley 325. As a result, the first link 302, the second link 303, and the third link 304 can be oscillated (flexed and extended) by the motor 330 of the back portion of the hand. A bearing (not shown) is provided in the gear 305, and the gear 305 and the base link 301 are coupled to each other so that torque of the motor 330 and torque of the gear 305 do not interfere with each other. The other configurations in which the first link, the second link, and the third link are driven are similar to those of the above-mentioned FIG. 24.

(2-6) Other Cases

Such a configuration may be employed that a reduction device is also combined with the above-mentioned first motor and second motor. In that case, output torque becomes large. In addition, a wire made by winding a thin wire (made of metal or nylon) around a wire core may be used for a belt, and even if both ends of the wire are joined with metal via a drive pulley, a driven pulley, and an idle pulley to make a circle, the operation shown in the above can be achieved, and in this case, if a resin material is used for a drive pulley, a driven pulley, and an idle pulley, a drive transmission system becomes lightweight.

<Third Embodiment>

Next, a third embodiment will be explained. In the embodiment, adjustment of drive torque required for driving joints is performed by constraining drive of a joint shaft on a fingertip side using a joint constraining mechanism included in the shape-fitting mechanism, and thereby an object can be grasped in an enclosing manner by fingers.

Since configurations of the robot device 1 and the robot body 2 provided with a robot hand in accordance with the embodiment are similar to those of the above-mentioned first embodiment (FIG. 1), and a configuration of the robot hand in accordance with the embodiment is similar to that of the above-mentioned second embodiment (FIG. 10), explanation thereof will be omitted.

Figure 30:
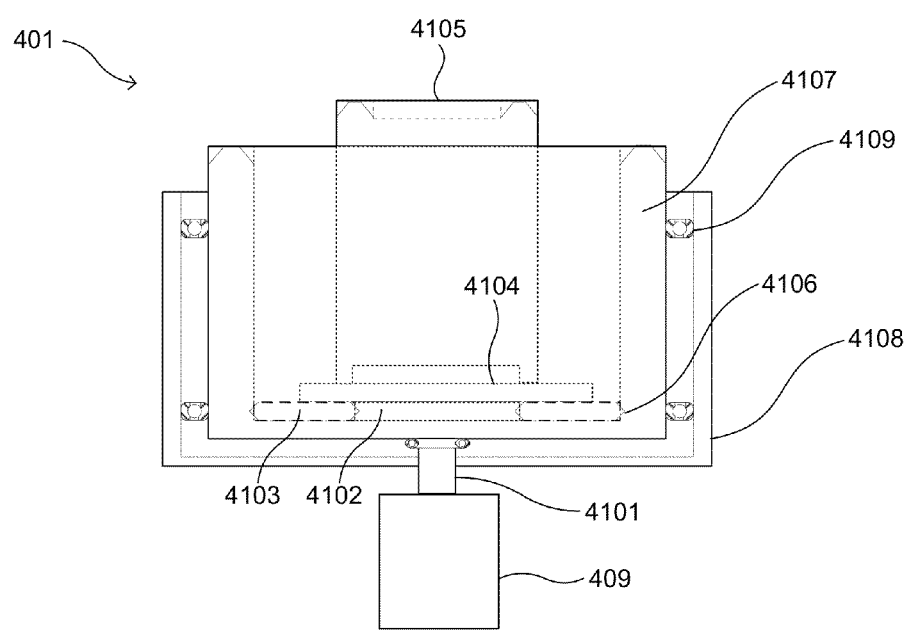
FIG. 30 is a sectional side view of a planetary gear mechanism provided at a finger portion of a robot hand in accordance with a third embodiment.
Figure 31:
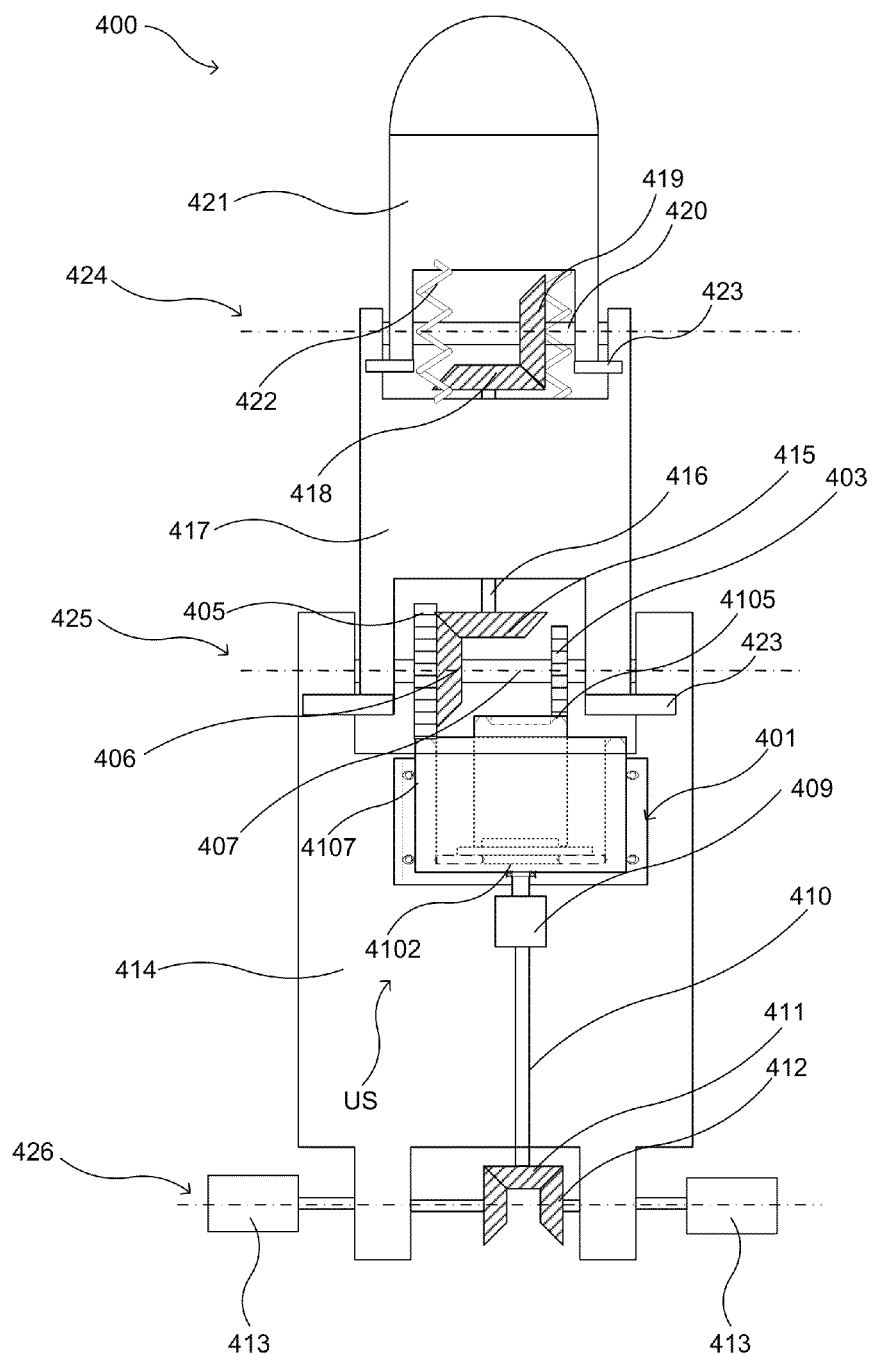
FIG. 31 is a sectional side view of the whole finger portion of the robot hand in accordance with the third embodiment.

Next, an internal structure of a whole finger portion 400 included in the robot hand in accordance with the embodiment will be explained using FIGS. 30 and 31. First, a planetary gear mechanism 401 included inside the finger portion 400 will be explained using FIG. 30. In FIG. 30, the planetary gear mechanism 401 has: a shaft 4101 that inputs output torque from a coupling 409 to a sun gear 4102; a planetary gear 4103 that inputs output of the sun gear 4102 to a carrier 4104; a carrier cup 4105 provided at the carrier 4104; the planetary gear 4103 that inputs the output of the sun gear 4102 to a ring gear 4106 in rotation of the carrier cup 4105 being stopped; a ring gear cup 4107 that has the ring gear 4106 thereinside; a bearing 4109 that rotatably supports the ring gear cup 4107; and a case 4108 that protects the planetary gear mechanism 401. In addition, cogs are provided at top surfaces of the carrier cup 4105 and the carrier cup 4107. It is to be noted that the planetary gear mechanism 401 corresponds to one example of the torque transmission mechanism described in the claims.

Next, an internal structure of the finger portion 400 will be explained using FIG. 31. In FIG. 31, in the finger portion 400, the carrier cup 4105 of the planetary gear mechanism 401 oscillates a second link 417 through the gear 403 in a paper-based depth direction and a paper-based front direction in FIG. 31. However, by a stopper 423, the second link 417 does not get warped in the paper-based front direction. Base sides of the gear 403 and the second link 417 are coupled to a second joint shaft 407 of a second joint 425. Namely, the second link 417 rotates centering on the second joint shaft 425 by rotation of the gear 403, and the finger portion 400 is flexed at the second joint 425.

Meanwhile, the ring gear cup 4107 of the planetary gear mechanism 401 rotates a third joint shaft 420 of a third joint 424 through the gear 405, bevel gears 406 and 415, the shaft 416, and bevel gears 418 and 419, and oscillates a third link 421 in the paper-based depth direction and the paper-based front direction. However, by a stopper 423, the third link 421 does not get warped in the paper-based front direction. Relative angle displacement of the gear 405 and the bevel gear 406 is constrained to be zero, and these gears 405 and 406 are rotatable to the second joint shaft 425. That is, although omitted on the paper, a bearing is incorporated inside the gear 405 and 406. A spring 422 is constrained so that a relative angle of the third link 421 and the second link 417 is zero. Constraint of drive of the third joint shaft 420 by the spring 422 is performed until the second link 417 gets contact with the object to be grasped 9 and rotation of the second joint shaft 407 is stopped, and the ring gear cup 4107 maintains a rest state in the meantime.

Drive torque of the planetary gear mechanism 401 is differential torque of two pairs of motors 413 (actuators), and is input to the sun gear 4102 of the planetary gear mechanism 401 through bevel gears 411 and 412, the shaft 410, and the coupling 409. In addition, synthetic torque of two pairs of motors 413 is the torque for oscillating a first link 414 around the first joint shaft 426 in the paper-based depth direction and the paper-based front direction.

Commonly, a planetary gear mechanism is a mechanism that fixes any one of a sun gear, a carrier, and a ring gear, and decelerates or accelerates output with respect to input. In the embodiment, the sun gear 4102 serves as input and the carrier 4104 and the ring gear 4106 serve as output. However, as things stand, it is not determined which the carrier 4104 and the ring gear 4106 that serve as the output first start to move, or simultaneously move. Here, the ring gear 4106 is indirectly constrained by the spring 422 so that the second joint 425 starts to move prior to the third joint 424 in grasping operation being performed. By constraining the ring gear 4106 as described above, underactuated fingers by the planetary gear mechanism 401 can also achieve following grasp.

As described above, in the embodiment, the finger portion 400 is provided with the sun gear 4102, the carrier 4104, and the ring gear 4106, and provided is the shape-fitting mechanism US having: the planetary gear mechanism 401 in which the carrier 4104 is indirectly coupled to the second joint shaft 407, and the ring gear 4106 is to the third joint shaft 420; and the spring 422 that constrains rotation of the third joint shaft 420 so that drive torque required for driving the second joint shaft 407 is smaller than drive torque required for driving the third joint shaft 420 (in other words, adjusts so as to increase drive torque of the third joint shaft) in grasping operation being performed, and it becomes possible to grasp the object to be grasped 9 by the finger portion 400 by adjusting drive torque required for driving the third joint 424. It is to be noted that the spring 422 corresponds to one example of the drive torque adjusting member and the joint constraining mechanism described in the claims.

In addition, by using an interference mechanism, angle control of the first link 414 is performed by the synthetic torque, and angle control of the second link 417 and the third link 421 is performed by the differential torque. For example, a case is considered where one point of an inner circumference and one point of an outer circumference of a doughnut-shaped object (tape for packing, etc.) by the robot hand with two fingers. First, posture control of the first link is performed so that the two fingers are arranged at the inner circumference and the outer circumference of the doughnut-shaped object. Subsequently, posture control of the second and third links is performed, and thereby it becomes possible to grasp one point of the inner circumference and one point of the outer circumference of the doughnut-shaped object. In a manner described above, posture control can be achieved even in underactuation.

Figure 32A:
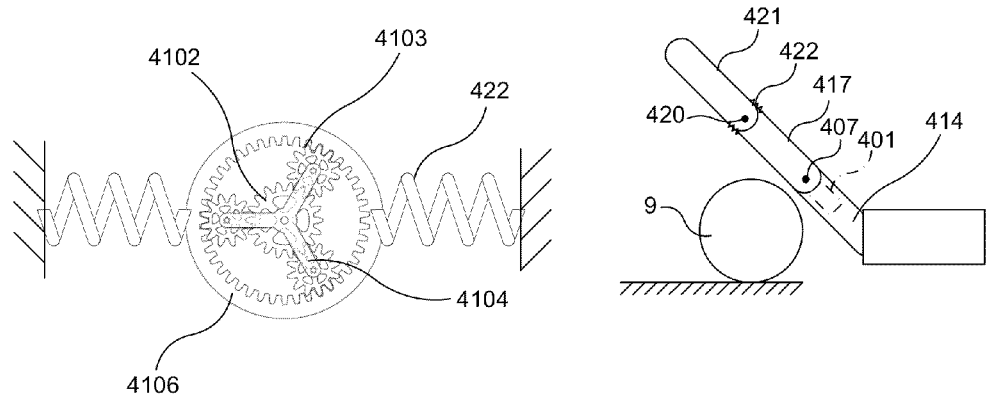
FIGS. 32A to 32C are explanatory views for explaining an operating principle of the finger portion in accordance with the third embodiment.
Figure 32B:
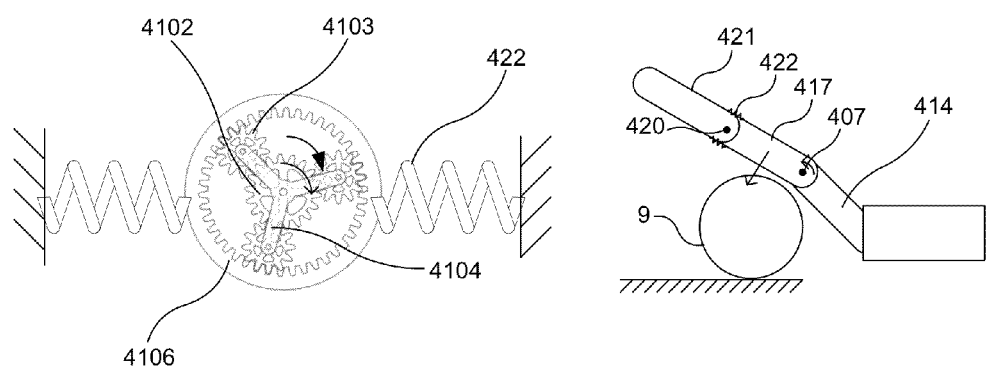
Figure 32C:
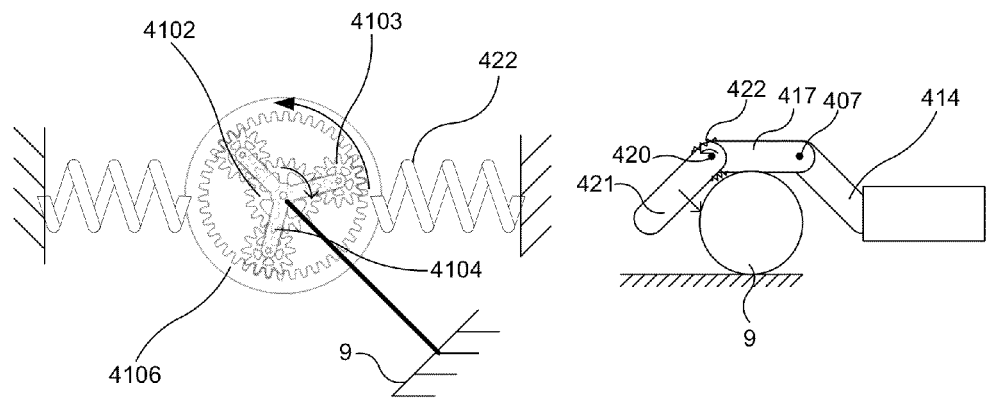

Next, an operating principle of the shape-fitting mechanism US in the finger portion 400 will be explained using FIGS. 32A to 32C. In FIGS. 32A to 32C, the planetary gear mechanism 401 is provided with: the sun gear 4102; the planetary gear 4103; the carrier 4104; and the ring gear 4106, and the ring gear 4106 is indirectly constrained by the spring 422 as mentioned above. This spring 422 is arranged between the second link 417 and the third link 421. FIG. 32A shows a state where input torque to the sun gear 4102 is zero. Next, as shown in FIG. 32B, when clockwise torque is input to the sun gear 4102, the planetary gear 4103 rotates, and simultaneously the carrier 4104 similarly rotates clockwise. As a result, the second link 417 moves toward the object to be grasped 9 centering on the second joint shaft 407. At this time, since the third joint shaft 420 is constrained by the spring 422, and thereby the ring gear 4106 has stopped, a relative angle of the second link 417 and the third link 421 is zero. Subsequently, when the second link 417 gets contact with the object to be grasped 9, drive of the second joint shaft 407 is constrained, and the carrier 4104 is constrained. As a result, as shown in FIG. 32C, counterclockwise torque occurs at the ring gear 4106, and the third link 421 moves toward the object to be grasped 9 centering on the third joint shaft 420. When the first link 414, the second link 417, and the third link 421 get contact with the object to be grasped 9, both the carrier 4104 and the ring gear 4106 are constrained, and thereby the planetary gear 4103 and the sun gear 4102 are stopped.

According to the third embodiment described above, the shape-fitting mechanism US having the planetary gear mechanism 401 and the spring 422 as the torque transmission mechanism is provided at the finger portion 400, the second joint 425 and the third joint 424 are flexed in that order in grasping operation being performed, and it becomes possible to grasp the object to be grasped in an enclosing manner by the finger portion 400 even in any posture by adjusting drive torque required for driving the third joint 424. As a result, the robot hand can perform flexible grasping following the shape of the object to be grasped 9 with respect thereto.

It is to be noted that the present disclosure is not regulated to the above-described embodiment, and various modifications can be made without departing from the subject matter and the technical idea of the disclosure. Hereinafter, such modified examples will be explained in order.

(3-1) Case of planetary gear mechanism that performs torque transmission using pulley Although the cogs are provided at the top surfaces of the carrier cup 4105 and the ring gear cup 4107, and torque is transmitted using the cogs in the above-described third embodiment, the disclosure is not regulated to this, and such a configuration may be employed that torque transmission is performed using a pulley. The modified example will be explained with reference to FIG. 33.

Figure 33:
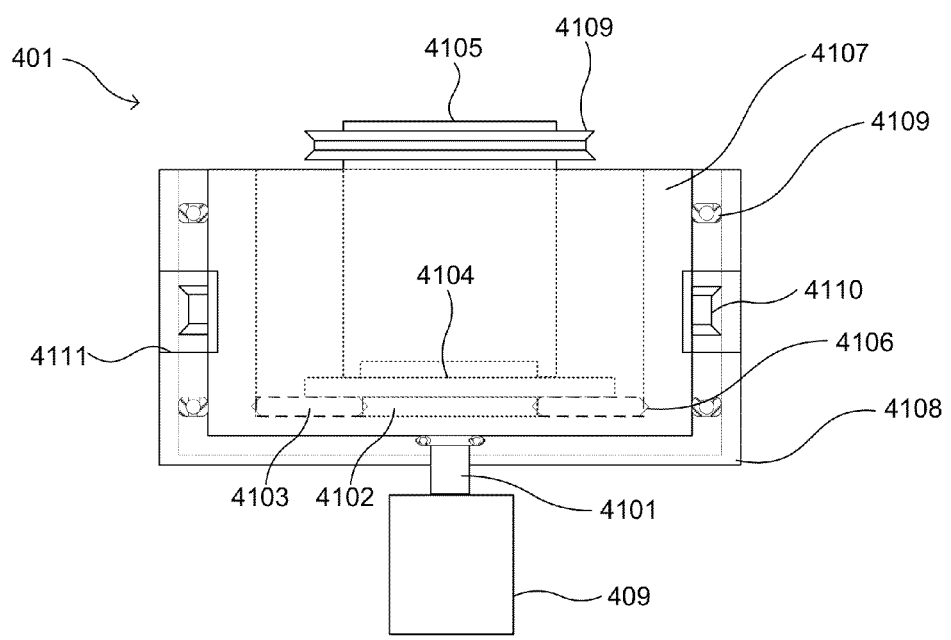
FIG. 33 is a sectional side view of a planetary gear mechanism of a modified example where torque transmission is performed using a pulley.

In FIG. 33, the planetary gear mechanism 401 is provided with a pulley 4109 and a pulley 4110 in outer circumferences of the carrier cup 4105 and the ring gear cup 4107, respectively, and is provided with a hole (or gap) 4111 through which belt transmission is performed to a case 4108. The other configurations are similar to those of the above-described third embodiment. Also according to the modified example, an effect similar to that of the above-described third embodiment is obtained.

(3-2) Case of joint constraining mechanism that constrains shaft

Although the third joint 424 is constrained by constraining the relative angle of the third link 421 and the second link 417 using the spring in the above-described third embodiment, the disclosure is not regulated to this, and the shaft 416 may be constrained. The modified example will be explained with reference to FIGS. 34A to 34C.

Figure 34A:
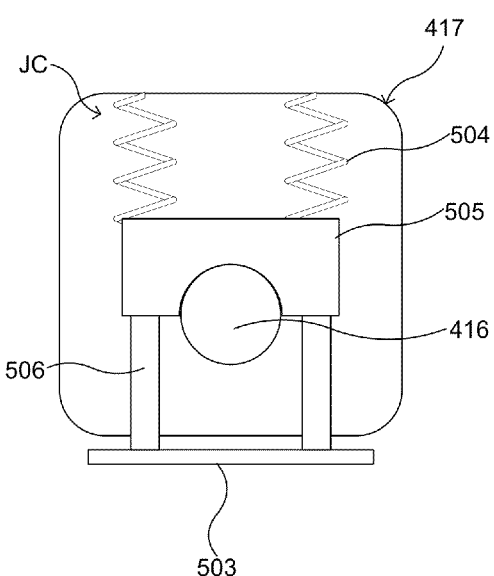
FIGS. 34A to 34C are views representing a configuration of a joint constraining mechanism that constrains a joint by constraining a shaft.
Figure 34B:
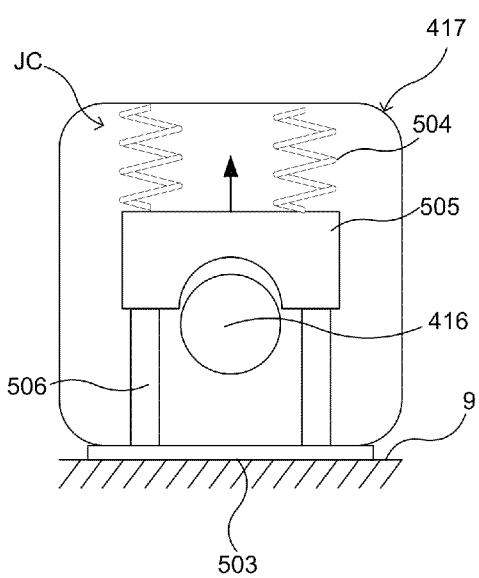
Figure 34C:
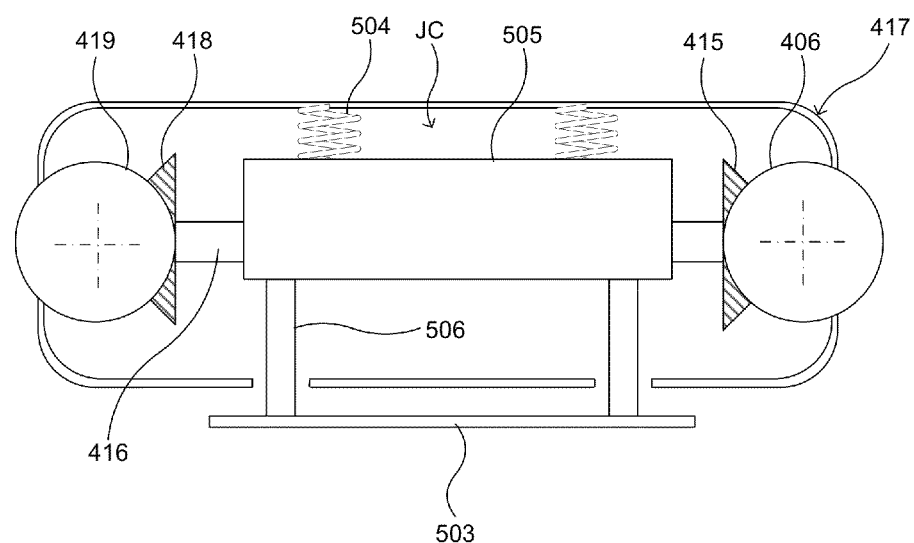

In FIGS. 34A to 34C, a joint constraining mechanism JC that constrains drive of the third joint shaft 420 is provided inside the second link 417. This joint constraining mechanism JC has: a stopper 505; a spring 504 provided on one side of the stopper 505; a support member 506 that is provided on the other side of the stopper 505, and that connects the stopper 505 and a pad 503. FIG. 34A represents a state before the second link 417 gets contact with the object to be grasped 9, and FIG. 34B represents a state after the second link 417 got contact with the object to be grasped 9. As shown in FIG. 34A, before the second link 417 gets contact with the object to be grasped 9, the stopper 505 is in contact with the shaft 416 due to weight of the spring 504 and the stopper 505. The shaft 416 is constrained by the stopper 505, thereby the ring gear cup 4107 is constrained, and a relative angle of the second link 417 and the third link 421 becomes zero. When the pad 503 gets contact with the object to be grasped 9, and the support member 506 is pushed inside the second link 417, the spring 504 is shrunk, the stopper 505 detaches from the shaft 416, and constraint of the shaft 416 is lost. As a result, output torque of the sun gear 4102 is transmitted to the ring gear 4106, and the ring gear cup 4107 rotates. This rotation oscillates the third link 421. FIG. 34C is a side portional view of the second link 417, and as shown in this FIG. 34C, the stopper 505 has a configuration that partially covers the shaft 416.

According to the above-described configuration, the joint constraining mechanism JC constrains drive of the joint shaft 420 of the third joint 424 so that drive torque required for driving the second joint 425 is larger than the drive torque required for driving the third joint 424 in grasp release operation being performed. As a result, it is possible to grasp the object to be grasped in an enclosing manner by the finger portion 400.

(3-3) Case of joint constraining mechanism that constrains ring gear cup

Although drive of the third joint 424 is constrained by constraining the shaft in the above-described third embodiment, the disclosure is not regulated to this, and the ring gear cup 4107 of the planetary gear mechanism 401 may be constrained. The modified example will be explained with reference to FIGS. 35A to 35C.

Figure 35A:
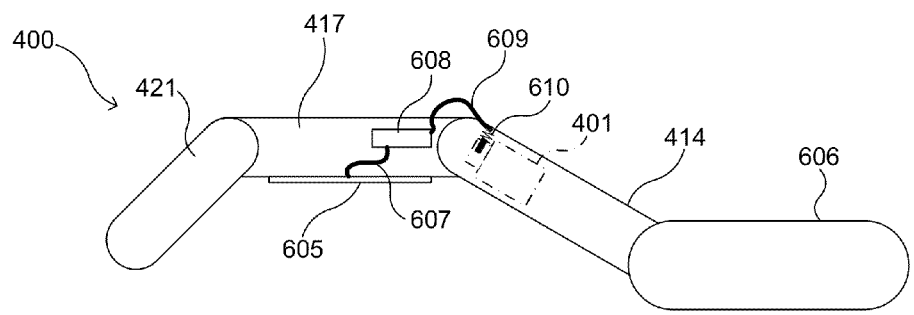
FIGS. 35A to 35C are views representing the configuration of the joint constraining mechanism that constrains the joint by constraining the shaft using shape memory alloy.

As shown in FIG. 35A, a robot hand has the three-joint finger portion 400 configured with the first link 414, the second link 417, and the third link 421, and a palm portion 606. The above-mentioned planetary gear mechanism 401 is incorporated inside the first link 414. In addition, a contact sensor 605 is provided outside the second link 417. A sensor that outputs an electrical signal in response to stress (for example, a strain gauge, a pressure sensor, etc.) is used as the contact sensor 605. An electrical signal of the contact sensor 605 is input to an amplifier 608 in the inside of the second link 417 through a cable 607, and the amplified signal is applied to shape memory alloy 610 in the inside of the first link 414 through a cable 609.

Figure 35B:
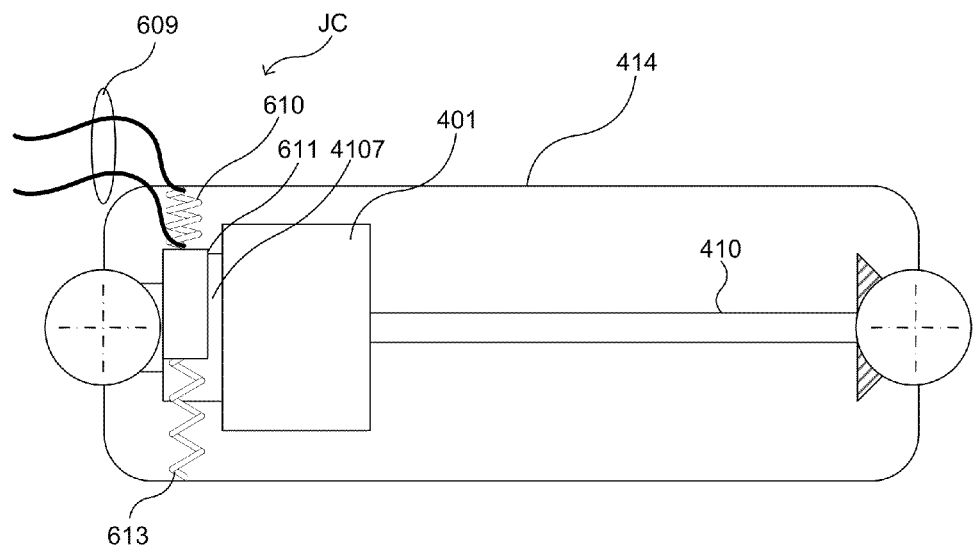
Figure 35C:
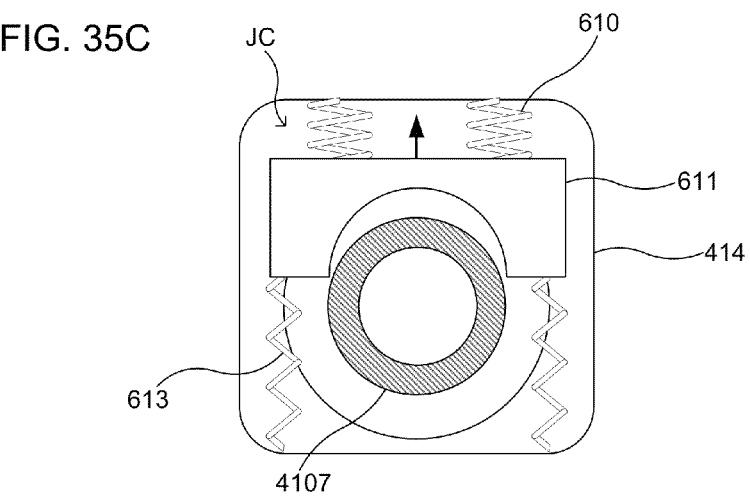

As shown in FIG. 35B, the joint constraining mechanism JC in the inside of the first link 414 has: a stopper 611 that constrains the ring gear cup 4107; the coiled shape memory alloy 610 that connects the inside of the first link 414 and the stopper 611; and the cable 609 that applies a current to the shape memory alloy 610 and a spring 613. When the contact sensor 605 is not in contact with the object to be grasped 9, a current applied to the shape memory alloy 610 is small, and therefore the stopper 611 constrains the ring gear cup 4107 by tensional force of the spring 613 as shown in FIG. 35B. Meanwhile, when the contact sensor 605 gets contact with the object to be grasped 9, a current is applied to the shape memory alloy 610, therefore as shown in FIG. 35C, the shape memory alloy 610 is shrunk, the stopper 611 moves away from the ring gear cup 4107, and constraint is lost. As a result, the ring gear cup 4107 rotates by torque transmitted from the sun gear 4102 to the ring gear 4106 of the planetary gear mechanism 401. This rotation oscillates the third link 421. Also according to the modified example, an effect similar to that of the above-described third embodiment is obtained.

(3-4) Case of using wave gear mechanism as torque transmission mechanism

Although the planetary gear mechanism is used as the torque transmission mechanism in the above-described third embodiment, the present disclosure is not regulated to this, and a wave gear mechanism may be used. The modified example will be explained with reference to FIGS. 36 and 37.

Figure 36A:
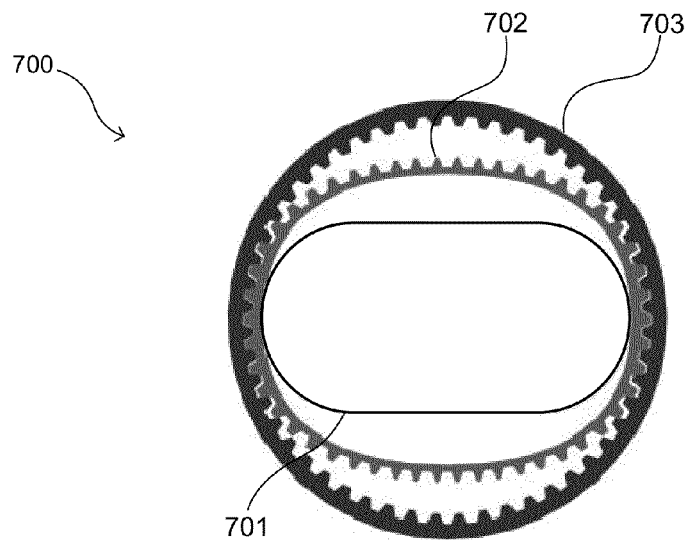
FIG. 36A is a horizontal sectional view of a wave gear mechanism in a modified example where the wave gear mechanism is used as a torque transmission mechanism.
Figure 36B:
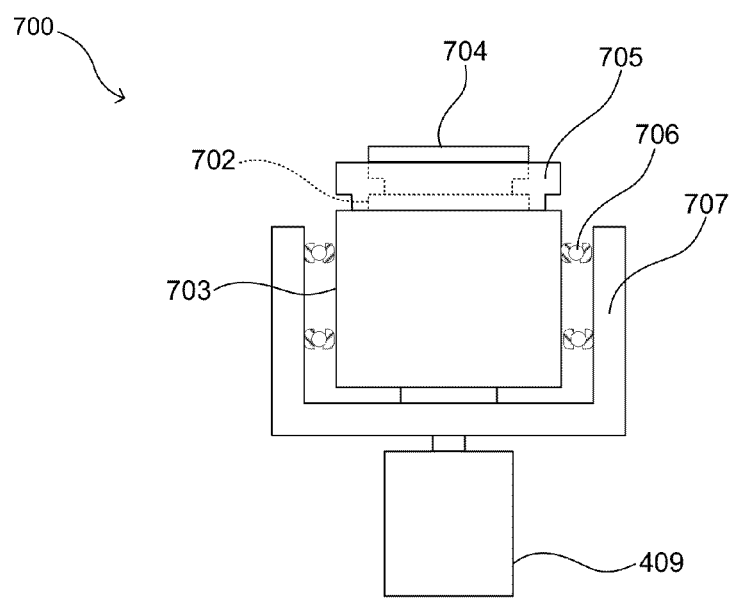
FIG. 36B is a sectional side view of the wave gear mechanism in the modified example where the wave gear mechanism is used for the torque transmission mechanism.

As shown in FIG. 36A, a wave gear mechanism 700 has: a wave generator 701; a flex spline 702; and a circular spline 703. As shown in FIG. 36B, in the embodiment, a flex spline cup gear 704 is provided at the flex spline 702, and a circular spline cup gear 705 is provided at the circular spline 703. In addition, a bearing 706 is arranged between the circular spline 703 and a case 707, and the circular spline 703 is rotatably supported. According to such a configuration, the wave gear mechanism 700 serves as a single-input double-output torque transmission mechanism similar to the planetary gear mechanism 401 of the above-described third embodiment. The modified example has a configuration in which the planetary gear mechanism 401 of the finger portion 400 shown in FIG. 31 is replaced with the wave gear mechanism 700 by using the wave gear mechanism 700 to drive the second joint 425 and the third joint 424 of the robot hand, and therefore the same operation can be achieved. In this case, the wave generator 701 serves as input, and the flex spline cup gear 704 and the circular spline cup gear 705 serve as output.

Also according to the modified example, an effect similar to that of the above-described third embodiment is obtained. In addition, since fewer gear parts are used compared with the case of using a planetary gear mechanism, there is an effect that can make a finger portion lightweight.

Figure 37:
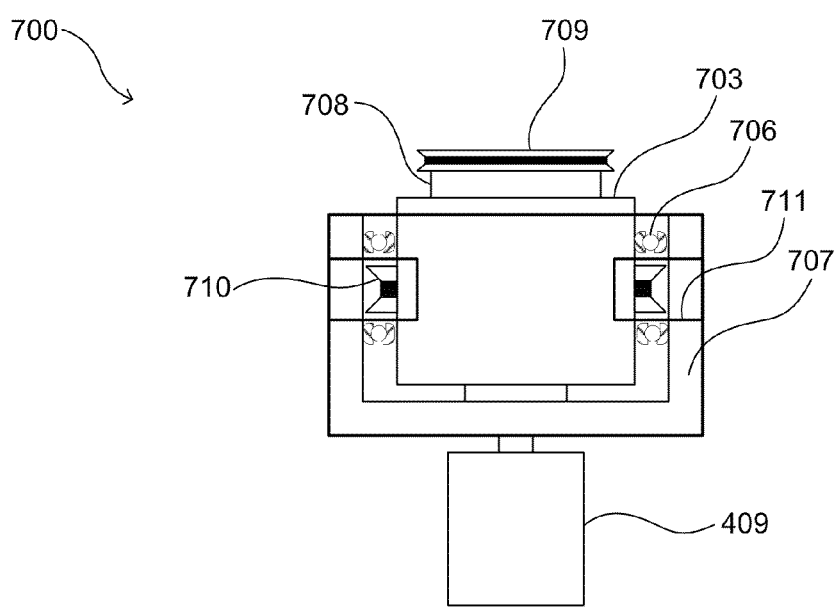
FIG. 37 is a sectional side view of a wave gear mechanism of a modified example where torque transmission is performed using a pulley.

Next, an other configuration example of the wave gear mechanism 700 will be explained using FIG. 37. In FIG. 37, a flex spline cup 708 and a pulley 709 are provided at the flex spline 702 (not shown in FIG. 37), and a pulley 710 is provided in the circular spline 703. A belt that is not shown is spanned between these pulleys 709 and 710, and a pulley provided at a finger of the robot hand, and thereby torque is transmitted. The other configurations are similar to the above. Also according to the modified example, an effect similar to that of the above-described third embodiment is obtained. In addition, in this case, the belt between the pulleys 709 and 710, and the pulley provided at the finger of the robot hand is lengthened, and thereby it also becomes possible to store the wave gear mechanism 700 described in the modified example in the palm portion, and the finger portion can be made lightweight.

In addition, also other than the embodiments and modified examples having already described above, the schemes according to the above-described embodiments and each modified example may be appropriately combined with one another to utilize. Although exemplification is not made point by point in addition to the above, various changes are added to carry out the present disclosure without departing from the subject matter of the disclosure.

What is claimed is:

1. A robot hand of underactuated mechanism, comprising:
a plurality of actuators;
a plurality of joints where the number of the joints is more than the number of the actuators;
a palm portion;
at least two finger portions each including a plurality of links having bases coupled to the palm portion and coupled being capable of flexion;
two small link members which are provided in at least one finger portion of the finger portions in place of one link of the plurality of links; and
a twist mechanism configured to couple the two small link members around an axis of rotation so as to be capable of mutually relative torsional displacement about the axis of rotation, the axis of rotation extending along a longitudinal direction of the two small link members.

2. The robot hand according to claim 1, wherein:
the robot hand comprises three or more of the finger portions, and
each of the three or more finger portions includes:
three or more of the links including a first link, a second link, and a third link that are disposed in that order from a palm side toward a fingertip; and
three or more of the joints including a first joint configured to couple the first link and the palm side of the first link being capable of flexion, a second joint configured to couple the second link and the first link being capable of flexion, and a third joint configured to couple the third link and the second link being capable of flexion, and
at least one link of the first to third links provided in at least one of the finger portion among the three or more finger portions is formed by the two small link members.

3. The robot hand according to claim 2, wherein:
the twist mechanism includes:
a shaft member provided at one of the two small link members; and
a bearing member provided at the other of the two small link members and configured to rotatably support the shaft member.

4. The robot hand according to claim 3, wherein:
the twist mechanism includes a guide member for guiding relative rotation of the two small link members along with rotation of the shaft member.

5. The robot hand according to claim 3, wherein:
the twist mechanism includes a regulating member for regulating an amount of rotation in a relative rotation direction of the two small link members within a predetermined range along with the rotation of the shaft member.

6. The robot hand according to claim 3, wherein:
the twist mechanism includes
a return force providing member for providing return force that displaces in a reverse rotation direction the two small link members that are displaced in a positive rotation direction along with the rotation of the shaft member.

7. The robot hand according to claim 6, wherein:
the return force providing member includes a first spring member having one end side fixed to one of the two small link members, and the other end side fixed to the other of the two small link members.

8. The robot hand according to claim 3, wherein:
the first link is configured by the two small link members, the actuators include:
a first actuator provided at the palm portion and configured to generate first drive force for flexing the first link;
a second actuator provided at the small link member on a side of the second link of the two small link members and configured to generate second drive force for flexing the second link and the third link, and wherein
the robot hand further comprises:
a second-link drive transmission mechanism configured to transmit the second drive force from the second actuator to the second link; and
a third-link drive transmission mechanism configured to transmit the second drive force from the second actuator to the third link.

9. The robot hand according to claim 8, wherein:
the second-link drive transmission mechanism includes a gear mechanism configured to transmit the second drive force to the second link by gear coupling, and
the third-link drive transmission mechanism includes a pulley mechanism configured to transmit the second drive force to the third link by a belt member or a wire member that is spanned between a pulley provided at the third link and a pulley provided at the second link.

10. The robot hand according to claim 8, wherein:
the shaft member includes an axial through-hole for allowing a cable member to the second actuator to pass through.

11. A robot device comprising:
a robot hand of an underactuated mechanism; and
a controller that controls the robot hand,
the robot hand including:
a plurality of actuators;
a plurality of joints where the number of the joints is more than the number of the actuators;
a palm portion;

at least two finger portions each including a plurality of links having bases coupled to the palm portion, and coupled being capable of flexion;

two small link members which are provided in at least one finger portion of the finger portions in place of one link of the plurality of links; and a twist mechanism configured to couple the two small link members around an axis of rotation so as to be capable of mutually relative torsional displacement about the axis of rotation, the axis of rotation extending along a longitudinal direction of the two small link members.

12. The robot device according to claim 11, wherein:

the robot hand comprises three or more of the finger portions, and each of the three or more finger portions includes:

three or more of the links including a first link, a second link, and a third link that are disposed in that order from a palm side toward a fingertip; and three or more of the joints including a first joint configured to couple the first link and the palm side of the first link being capable of flexion, a second joint configured to couple the second link and the first link being capable of flexion, and a third joint configured to couple the third link and the second link being capable of flexion, and at least one link of the first to third links provided in at least one of the finger portion among the three or more finger portions is formed by the two small link members.

13. The robot device according to claim 12, wherein:

the first link of the robot hand is configured by the two small link members, the actuators of the robot hand include:

a first actuator provided at the palm portion and configured to generate first drive force for flexing the first link;

a second actuator provided at the small link member on a side of the second link of the two small link members, and configured to generate second drive force for flexing the second link and the third link, and wherein the robot hand further includes:

a second-link drive transmission mechanism configured to transmit the second drive force from the second actuator to the second link; and a third-link drive transmission mechanism configured to transmit the second drive force from the second actuator to the third link, and wherein the controller controls drive of the first actuator and the second actuator.

* * * * *